United States Patent
Unsal et al.

(10) Patent No.: US 10,394,700 B1
(45) Date of Patent: Aug. 27, 2019

(54) SYSTEM AND METHOD FOR IDENTIFYING A SUBSET OF TOTAL HISTORICAL USERS OF A DATA MANAGEMENT SYSTEM TO REPRESENT A FULL SET OF TEST SCENARIOS BASED ON PREHASHING OF CODE COVERAGE INFORMATION

(71) Applicant: Intuit Inc., Mountain View, CA (US)

(72) Inventors: Cem Unsal, Alameda, CA (US); Anu Sreepathy, Sunnyvale, CA (US); Saikat Mukherjee, Fremont, CA (US); David A. Hanekamp, Jr., Carlsbad, CA (US); Gang Wang, San Diego, CA (US); Michael A. Artamonov, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/999,156

(22) Filed: Aug. 17, 2018

(51) Int. Cl.
  *G06F 9/44* (2018.01)
  *G06F 11/36* (2006.01)

(52) U.S. Cl.
  CPC ...... *G06F 11/3684* (2013.01); *G06F 11/3676* (2013.01); *G06F 11/3688* (2013.01)

(58) Field of Classification Search
  None
  See application file for complete search history.

(56) References Cited

U.S. PATENT DOCUMENTS

2003/0188298 A1 * 10/2003 Shaposhnick ....... G06F 11/3676 717/141

* cited by examiner

*Primary Examiner* — Qamrun Nahar
(74) *Attorney, Agent, or Firm* — Hawley Troxell Ennis & Hawley LLP; Philip McKay

(57) ABSTRACT

A method and system generates sufficient sample data sets for efficiently and accurately testing a new calculation for preparing a portion of an electronic document for users of an electronic document preparation system. The method and system prepares the new calculation and gathers historical user data related to previously prepared electronic documents for a large number of historical users. The method and system generates a representative value for each historical user data, based on the sections of a previous version of electronic document preparation software which were executed for each historical user in preparing electronic documents for the historical users. The method and system groups the historical users based on the hash values which indicates the historical user's behavior in the software. The groups are then sampled by selecting a small number of historical users from each group.

31 Claims, 8 Drawing Sheets

|  | User 1 | User 2 | User 3 | User 4 | User 5 | ... | User N−1 | User N |
|---|---|---|---|---|---|---|---|---|
| Code Section 1 | 0 | 1 | 1 | 0 | 1 | ... | 0 | 0 |
| Code Section 2 | 1 | 1 | 0 | 1 | 1 | ... | 1 | 0 |
| Code Section 3 | 1 | 0 | 0 | 1 | 0 | ... | 1 | 1 |
| Code Section 4 | 1 | 0 | 1 | 0 | 0 | ... | 1 | 0 |
| Code Section 5 | 0 | 0 | 0 | 1 | 0 | ... | 0 | 1 |
| Code Section 6 | 1 | 1 | 1 | 1 | 1 | ... | 1 | 1 |
| Code Section 7 | 1 | 0 | 0 | 0 | 0 | ... | 1 | 0 |
| Code Section 8 | 0 | 1 | 0 | 0 | 1 | ... | 0 | 0 |
| ⋮ | ⋮ | ⋮ | ⋮ | ⋮ | ⋮ |  | ⋮ | ⋮ |
| Code Section M−1 | 0 | 1 | 0 | 1 | 1 | ... | 0 | 1 |
| Code Section M | 0 | 0 | 1 | 0 | 0 | ... | 0 | 1 |
| 156 → | OAJE3VNJAL | F638AAPK33 | I1PNWE09Y2 | K38Z610ZDD | F638AAPK33 | ... | OAJE3VNJAL | QBV389H0A |

| | User 1 | User 2 | User 3 | User 4 | User 5 | ... | User N-1 | User N |
|---|---|---|---|---|---|---|---|---|
| Code Line 1 | 0 | 1 | 0 | 0 | 1 | ... | 0 | 1 |
| Code Line 2 | 0 | 0 | 1 | 1 | 1 | ... | 1 | 1 |
| Code Line 3 | 1 | 1 | 0 | 1 | 0 | ... | 0 | 0 |
| Code Line 4 | 0 | 0 | 1 | 0 | 1 | ... | 1 | 1 |
| Code Line 5 | 1 | 0 | 0 | 1 | 0 | ... | 0 | 0 |
| Code Line 6 | 1 | 1 | 1 | 0 | 1 | ... | 1 | 1 |
| Code Line 7 | 1 | 0 | 1 | 1 | 0 | ... | 1 | 0 |
| Code Line 8 | 0 | 1 | 0 | 0 | 1 | ... | 0 | 1 |
| ⋮ | ⋮ | ⋮ | ⋮ | ⋮ | ⋮ | | ⋮ | ⋮ |
| Code Line M-1 | 0 | 1 | 0 | 1 | 1 | ... | 0 | 1 |
| Code Line M | 0 | 0 | 1 | 0 | 0 | ... | 0 | 0 |

156 → | A9VLDKEAN | SDFAKDASD | 93NCJRGSII | K38Z61OZDD | QBV389HOA | ... | A3NNA3JOA | QBV389HOA |

FIG. 3

| | User 1 | User 2 | User 3 | User 4 | User 5 | ... | User N−1 | User N |
|---|---|---|---|---|---|---|---|---|
| Code Line 1 | 0 | 1 | 0 | 0 | 1 | ... | 0 | 1 |
| Code Line 4 | 0 | 0 | 1 | 1 | 1 | ... | 1 | 1 |
| Code Line 11 | 1 | 1 | 0 | 1 | 0 | ... | 0 | 0 |
| Code Line 12 | 0 | 0 | 1 | 0 | 1 | ... | 1 | 1 |
| Code Line 18 | 1 | 0 | 0 | 1 | 0 | ... | 0 | 0 |
| Code Line 43 | 1 | 1 | 1 | 0 | 1 | ... | 1 | 1 |
| Code Line 87 | 1 | 0 | 1 | 1 | 0 | ... | 1 | 0 |
| Code Line 92 | 0 | 1 | 0 | 0 | 1 | ... | 0 | 1 |
| 156 | SD3JFO3KLD | INED093DH | 93HOEK77II | 1OFODHH28 | 39FHLEI2ED | ... | I3HFIEHEIH | 39FHLEI2ED |

SYSTEM AND METHOD FOR IDENTIFYING A SUBSET OF TOTAL HISTORICAL USERS OF A DATA MANAGEMENT SYSTEM TO REPRESENT A FULL SET OF TEST SCENARIOS BASED ON PREHASHING OF CODE COVERAGE INFORMATION

BACKGROUND

Many people use electronic document preparation systems to help prepare important documents electronically. For example, each year millions of people use tax return preparation systems to help prepare and file their tax returns. Typically, tax return preparation systems receive tax related information from a user and then automatically populate the various fields in electronic versions of government tax forms. Tax return preparation systems represent a potentially flexible, highly accessible, and affordable source of tax return preparation assistance for customers.

The processes that enable the electronic tax return preparation systems to prepare tax returns for users are highly complex and often utilize large amounts of human and computing resources. To reduce the usage of computing and human resources, new tax return preparation processes are continually being developed. Of course, before the new tax return preparation processes can be implemented, they must be thoroughly tested to ensure that they properly calculate data values for tax returns. However, testing the new processes with a very large number of previous tax filers results in a very high use of computing and human resources in the testing process. On the other hand, testing the new processes with a smaller random sample of previous tax filers is often inadequate, as less common tax filer attributes will likely not appear in the sample set. If the new processes are not tested to ensure that the processes can accurately handle tax filers with uncommon attributes, then flaws in the new processes will likely go undetected. This results in the tax return preparation system failing to properly prepare the tax returns for many users.

In addition, lengthy and resource intensive testing processes can lead to delays in releasing an updated version of the electronic tax return preparation system as well as considerable expense. This expense is then passed on to customers of the electronic tax return preparation system. These expenses, delays, and possible inaccuracies often have an adverse impact on traditional electronic tax return preparation systems.

These issues and drawbacks are not limited to electronic document preparation systems. Any data management system that needs to update processes or calculations for data management services can suffer from these drawbacks during testing and development of new data management calculations and processes.

What is needed is a method and system that provides a technical solution to the technical problem of generating sample data sets that are likely to cover many use cases while efficiently using resources.

SUMMARY

Embodiments of the present disclosure provide one or more technical solutions to the technical problem of data management systems that are not able to generate sample data sets that will cover all, or most, use cases while efficiently using resources. The technical solutions include automatically generating sample test sets for testing new calculations or processes for a data management system with very small sample sizes that, nevertheless, result in representation of a large segment of possible users. Embodiments of the present disclosure execute a previous version of software code associated with the data management system for historical user data related to a large number of historical users of the data management system. Embodiments of the present disclosure generate, for each historical user, a respective code coverage representation value based on the lines or sections of software code that were executed for that historical user. Historical users for which the same portions of the code were executed will have identical code coverage representation values. The historical users are grouped based on the code coverage representation values. The sample test set data is generated by sampling one or more historical users from each code coverage representation value group. Because each group represents a unique combination of sections of the prior code, sampling a small number of historical users from each group will result in a sample test set that covers virtually all combinations of user attributes.

In one embodiment, the prior software instructions are executed, and the code coverage representation values stored, prior to receiving a specific request for a sampling of historical users. A data management process may include many data fields that need to be populated. The prior software instructions include a plurality of segments each for a respective data field. Each segment of prior code includes many sections or lines of code. Code coverage representation values are generated for each of these segments and stored. When experts need to test a new calculation corresponding to a new or updated version of a corresponding calculation from the prior code, experts can request a sampling of the historical users by requesting a small number of historical users from each unique code coverage representation value grouping. Because the code coverage representation values are already calculated and stored for every segment, sample test sets can be generated or retrieved rapidly any time a new calculation or process is to be tested.

Embodiments of the present disclosure overcome the drawbacks of traditional data management systems that generate sample test set data by taking a random sample of the entire group of historical users, resulting in the high likelihood that historical users with very rare combinations of attributes will not be present in the sample test set data. Calculating and storing the code coverage representation values utilizes significantly less memory and processing resources than storing the entirety of data indicating which lines or sections of code were executed for each historical user. Embodiments of the present disclosure also overcome the drawbacks of traditional data management systems that generate sample test set data including a very large number of historical users in order to increase the likelihood that historical users with rare attributes will be represented. Embodiments of the present disclosure overcome these drawbacks by providing a very small sample of historical users that will include all types of historical users based on analysis of previous versions of software code executed from the historical users.

BRIEF DESCRIPTION OF THE DRAWINGS

FIG. 2 is a code coverage table for generating efficient sample sets for testing new data management processes for a data management system, in accordance with one embodiment.

FIG. 3 is a code coverage table for generating efficient sample sets for testing new data management processes for a data management system, in accordance with one embodiment.

FIG. 4 is a code coverage table for generating efficient sample sets for testing new data management processes for a data management system, in accordance with one embodiment

Figure 1:
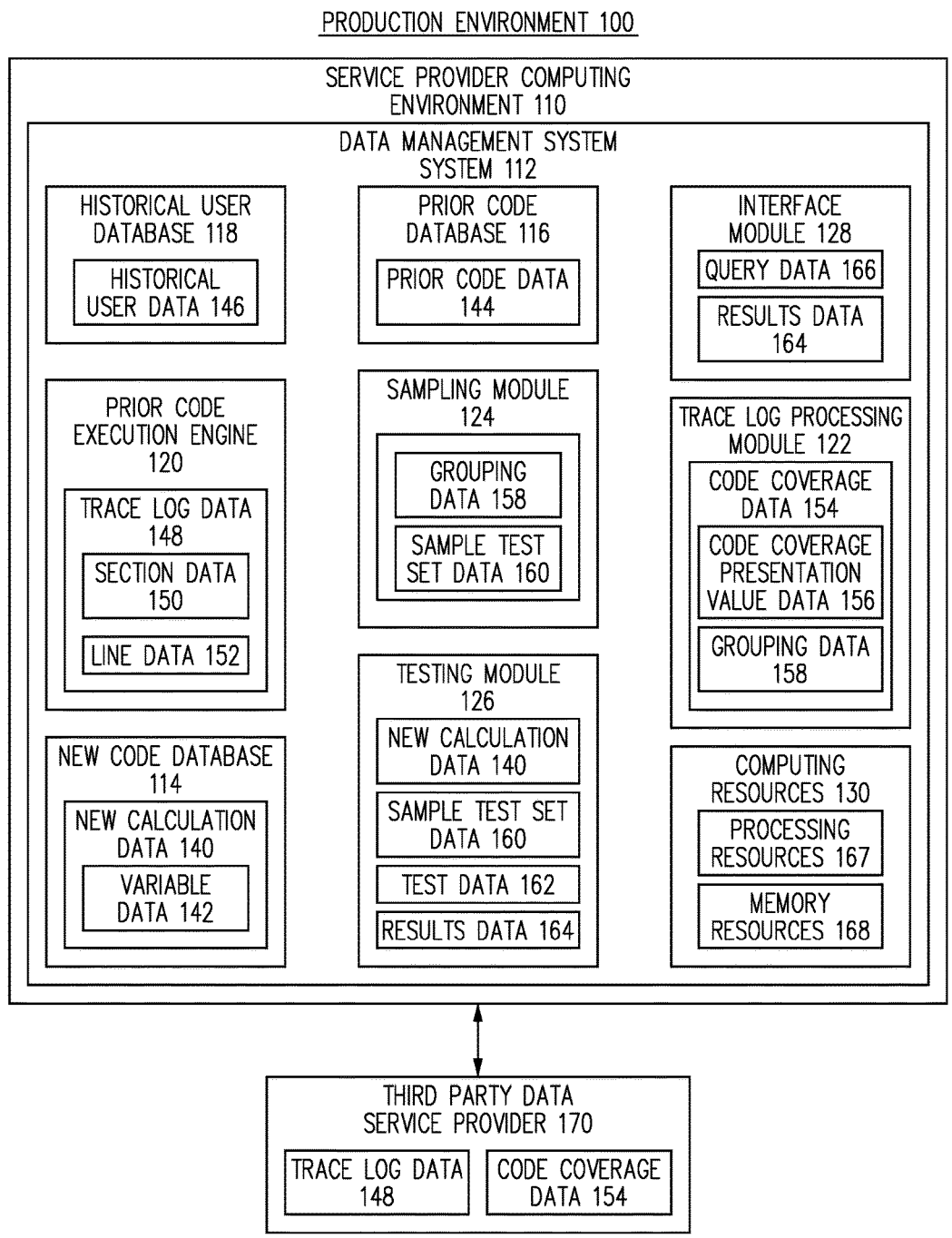
FIG. 1 is a block diagram of a system for generating efficient sample sets for testing new data management processes for a data management system, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

FIG. 1 illustrates a block diagram of a production environment 100 for generating efficient sample sets for testing new data management processes for a data management system, according to one embodiment. Embodiments of the present disclosure provide methods and systems for generating efficient sample sets for testing new data management processes for a data management system, according to one embodiment. Embodiments of the present disclosure generate code coverage data for a large number of historical users. The code coverage data indicates, for each historical user, the sections or lines of a prior version of the data management software instructions that were executed for each historical user. Embodiments of the present disclosure generate, for each historical user, a respective code coverage representation value based on the lines or sections of the code that were executed. Historical users for whom the same lines or sections of the prior software instructions were executed will have the same code coverage representation value. Embodiments of the present disclosure group the historical users into groups based on the code coverage representation values. When a new calculation needs to be tested, a sample test set of historical users can be generated for testing the new calculation by sampling a small number of historical users from each code coverage representation value group. Because there is a unique code coverage representation value for each unique path through the prior software instructions, a sample test set generated by sampling a small number of historical users from each unique code coverage representation value group results in a sample test set that is small, and yet, is highly likely to represent the full spectrum of historical user attributes.

In one embodiment, when the sample test set has been generated, the data management system can then test the new calculation for each historical user from the sample test set. If the test indicates that the calculation is correct for the whole sample test set, then the calculation is deemed reliable because it has been tested for all types of users, including the most common and the rarest types individuals. The result is a very efficient testing process because the sample test set includes a small number of historical users that is highly likely to represent the entire range of historical users.

In one embodiment, the code coverage representation values are preprocessed. Thus, when a new calculation is to be tested, a sample test set can be quickly gathered by sampling from the code coverage representation value groups. This alleviates the need to execute the prior code and generate code coverage data each time a new calculation is to be tested. Furthermore, storing a unique code coverage representation value for each historical user instead of storing the detailed full code coverage data results in more efficient use of memory, processing, and data transmission resources.

In one embodiment, the data management system generates multiple resolution tiers of code coverage data for each segment of the prior code data. A higher resolution tier could be based on every line of code in a given segment, as well as on combinations of lines of code. Lower resolution tiers could be based only on various selected subsets of the lines of code. The fewer lines of code in a subset, the lower the resolution of the sample test set generated therefrom. Lower resolution tiers could include ignoring combinations of lines of code. Lower resolution tiers can be useful for faster testing and for testing only certain aspects of a new process or calculation. For each tier related to a given segment, the code coverage data stores code coverage representation value data and grouping data. Sample test set data can be generated from whichever resolution tier is selected by a developer or tester. Alternatively, sample test sets of the various resolution tiers can be generated and stored for convenient retrieval at a later time. Because the various tiers are all pre-generated and stored, sample test sets of varying resolution can be generated or retrieved rapidly upon request.

In one embodiment, sample test sets of different resolution tiers can be utilized at different points in the testing process for a new calculation or process. At the beginning of the testing process, developers may wish to test with a sample set from the lowest resolution tier. As development proceeds further, higher resolution tiers can be used until testing is complete.

In one embodiment, the historical users are users for whom the data management system previously prepared an electronic document. The historical user data includes, for each historical user, the data related to the historical user that was utilized by the document preparation system to produce the electronic document for the historical user.

Embodiments of the present disclosure then test the new calculation for each historical user from the sample test set. If the test indicates that the calculation is correct for the whole sample test set, then the calculation is deemed reliable because it has been tested for the most common and the rarest types individuals. The result is a very efficient testing process because the sample test set includes a small number of historical users that is highly likely to represent the entire range of historical users.

In one embodiment, the preprocessing of the historical user data is performed in two separate steps in order to enable easily generating code coverage representation values multiple times, if desired. In the first preprocessing step, the prior version of the code is executed for each of the historical users and trace log data is generated. The trace log data indicates which lines of the code were executed, how many times a given line of the code was executed, the order in which lines of code were executed, and other information. The trace log data is stored in a data base. After the trace log data has been generated and stored, the code coverage representation value data is generated for each historical user based on the trace log data and based on selected criteria.

In one embodiment, because the trace log data has been stored, code coverage representation value data can be generated again based on other selected criteria. This means that code coverage representation value data can be generated having a selected resolution or level of detail. For greater resolution, the code coverage representation value data can be generated based on each line of the prior code that was executed for a historical user. For a lower level of resolution, the code coverage representation value can be generated only based on whether certain types of lines of code were executed. For example, the code coverage representation value can be generated only based on the variable assignment lines of code in which a value of a variable is assigned. In another example, the code coverage representation value can be generated only based on branches taken as a result of an if then statement. Generating the code coverage representation value based on only certain types of lines of code can further reduce the computing, memory, and data transmission resources utilized in generating the code coverage representation value data with respect to an example in which the hash value data is generated based on every executed line of code. Time spent for human analysis is also reduced by allowing developers and testers to test only the behaviors they are interested in.

The disclosed method and system for generating efficient sample sets for testing new data management processes for a data management system provide for the processing and storing of smaller amounts of data, i.e., for the more efficient analysis of forms and data; thereby eliminating unnecessary data analysis and storage. Consequently, using the disclosed method and system for generating efficient sample sets for testing new data management processes for a data management system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for generating efficient sample sets for testing new data management processes for a data management system.

Referring to FIG. 1, the production environment 100 includes a service provider computing environment 110 for generating efficient sample sets for testing new data management processes for a data management system, according to one embodiment. The service provider computing environment 110 represents one or more computing systems such as one or more servers or distribution centers that are configured to receive, execute, and host one or more data management systems (e.g., applications) for access by one or more users, for generating efficient sample sets for testing new data management processes for a data management system, according to one embodiment. The service provider computing environment 110 can represent a traditional data center computing environment, a virtual asset computing environment (e.g., a cloud computing environment), a hybrid between a traditional data center computing environment and a virtual asset computing environment, or other kinds of computing environments, as discussed herein, known in the art, or as become known after the time of filing, according to one embodiment.

In one embodiment, the service provider computing environment 110 includes a data management system 112, which is configured to provide data management services to a user.

According to one embodiment, the data management system 112 is an electronic document preparation system that assists in preparing compliance documents, such as financial documents related to one or more of tax return preparation, invoicing, payroll management, billing, banking, investments, loans, credit cards, real estate investments, retirement planning, bill pay, and budgeting or any other data management and form producing system as discussed herein, known in the art, or as become known after the time of filing. In one embodiment, the data management system 112 is a standalone system that provides data management services to users. Alternatively, the data management system 112 is integrated into other software or service products provided by a service provider.

In many situations data management systems generate new processes for providing data management services to user. For example, data management systems may update the process for calculating data values for an electronic form to improve the efficiency or accuracy of the process. If the electronic form is not correctly completed, there can be serious consequences for users. Thus, the data management system 112, in accordance with principles of the present disclosure, advantageously generates a sample test set for testing the new calculation that results in an efficient and accurate testing process.

In one embodiment, the data management system 112 gathers, retrieves, or maintains historical user data related to historical users of the data management system 112. The historical user data corresponds to data that was utilized by the data management system 112 in preparing electronic documents for the historical users. The historical user data can also include the previously prepared electronic documents. Thus, for each user, the historical user data includes data related to the attributes of the historical user relevant to the preparation of the electronic document. The historical user data is data that has been stripped of all Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

In one embodiment, to prepare for testing new calculations, the data management system 112 executes a previous version of data management software code for each historical user based on the historical user data. The data management system 112 executes different lines or sections of the previous software code for historical users with different attributes. The data management system 112 generates trace log data that indicates, for each historical user, the sections of the previous software code that were executed for the historical user.

In one embodiment, the trace log data also indicates data values that were provided or entered for certain lines or sections of code. In one embodiment, the trace log data indicates whether a particular data value is a positive number, zero, blank, or a negative number. In one embodiment, the prior software code includes lines that defines a variable as being the smaller, or minimum, of two or more other variables. In one example, the trace log data indicates which of the other variables was the minimum for each historical user. The trace log data notes these factors and these factors are used to identify unique groups of historical users for the purpose of generating sample test set data. Those of skill in the art will recognize, in light of the present disclosure, that trace log data can provide indications based on factors other than those set forth above.

In one embodiment, the data management system 112 receives new calculation data corresponding to a new process for calculating data values for an electronic document. The data management system 112 retrieves portions of the trace log data associated with the new calculation. The data management system 112 identifies, for each historical user, the sections of the previous software code executed in performing an old calculation related to the new calculation. The data management system 112 sorts the historical users into groups based on the combinations of previous code sections executed for the historical users. Each group corresponds to a unique combination of executed sections of code. This ensures that sampling a few historical users from each group will result in the sample test set that includes both common and rare types of historical users. This results in sampled sample test set data that includes historical user data related to a relatively small number of historical users and that, nevertheless, includes historical user data with rare but important data values. In this way, when new calculation data is tested, the test data can be generated from the historical user data associated with a relatively small number of historical users.

In one embodiment, the trace log data also indicates data values that were provided or entered for certain lines or sections of code. In one embodiment, the trace log data indicates whether a particular data value is a positive number, zero, blank, or a negative number. In one embodiment, the prior software code includes lines that defines a variable as being the smaller, or minimum, of two or more other variables. The trace log data indicates which of the other variables was the minimum for each historical user. The trace log data notes these factors and these factors are used to identify unique groups of historical users for the purpose of generating sample test set data, in one embodiment. Accordingly, in one embodiment, the trace log data identifies not only which sections of the previous code were executed for the various historical users, but also the data values associated with various lines or sections of code.

The data management system 112 includes a new code database 114, a prior code database 116, a historical user database 118, a prior code execution engine 120, a trace log processing module 122, a sampling module 124, a testing module 126, and an interface module 128, according to various embodiments.

In one embodiment, the data management system 112 includes computing resources 130. The computing resources 130 include processing resources 167 and memory resources 168. The processing resources 167 include one or more processors. The memory resources 168 include one or more memories configured as computer readable media capable of storing software instructions and other data. The processing resources 167 are capable of executing software instructions stored on the computer readable media. In one embodiment, the various components, modules, databases, and engines of the data management system 112 utilize the computing resources 130 to assist in performing their various functions. Alternatively, or additionally, the various components, modules, databases, and engines can utilize other computing resources.

In one embodiment, the new code database 114 includes new calculation data 140. The new calculation data 140 includes one or more new calculations for calculating data values associated with data management services provided by the data management system 112. In one embodiment, the new code database 114 includes a large number of candidate new calculations for preparing various parts of an electronic document.

In one embodiment, the new calculation data 140 includes a new calculation for generating data values for a form associated with an electronic document that the data management system 112 assists users to prepare. A single electronic document may include or utilize a large number of forms. Some of the forms may be a part of the electronic document. Other forms may be utilized by the data management system 112 to merely assist in preparing the electronic document. For example, some forms include worksheets for generating data values utilized in another form or portion of the electronic document. In one embodiment, the new calculation data 140 includes a new calculation for generating a data value associated with a form, or for generating multiple data values or all of the data values associated with a form. Thus, a single calculation from the new calculation data 140 can correspond to a process for populating an entire form or for populating a portion of a form.

In one embodiment, the new calculation data 140 includes variable data 142. The variable data 142 corresponds to variables associated with a calculation. In one example, the new calculation data 140 includes a calculation for generating a particular data value for a particular form. In one embodiment, the calculation includes multiple variables that correspond to data values or attributes associated with the user that are collected from the user as part of a data management interview. In another example, the new calculation data 140 includes a calculation for populating many data fields of a form. In one embodiment, the variable data 142 includes all of the variables associated with all the data fields of the form.

In one embodiment, the variable data 142 related to a particular calculation includes many kinds of variables. In one embodiment, the variables include answers to yes or no questions, monetary values that fall within a large range, nonmonetary number values, an integer that falls within a range of integers, whether or not the user has checked a box or made a particular selection, or other kinds of variables. The variable data 142 related to a particular calculation includes multiple of these different types of variables.

In one embodiment, the data management system 112 is a tax return preparation system. In this case, in one embodiment, the new calculation data 140 includes a new process for calculating data values for one or more data fields or lines of a tax form. In various embodiments, a single data field or line depends on variables such as, but not limited to, a user's gross income, a user's age, a number of dependents, taxes withheld, whether or not the user is a veteran, whether or not the user is a homeowner, whether or not a user has elected a particular tax preparation feature, data values from a separate tax worksheet, data values from a separate tax form, or many other kinds of tax related variables. Thus, in one embodiment, the calculation associated with the new calculation data 140 includes a large number of variables whose values may be provided by the user, obtained from the user, calculated in a different tax form, or as otherwise provided by any other source of variable data, as discussed herein, or as known in the art at the time of filing, or as developed after the time of filing. The variable data 142 associated with a particular tax related calculation identifies the tax related variables related to that calculation.

In one embodiment, the prior code database 116 includes prior code data 144 utilized by the data management system 112 in the past to perform various calculations to prepare electronic documents for users. The prior code data 144 corresponds to previously used software instructions. Thus, the prior code database 116 retains previous versions of software instructions utilized by the data management system 112. In one embodiment, the prior code database 116 includes software instructions currently used by the data management system 112 to prepare electronic documents.

In one embodiment, the data management system 112 retains the prior code data 144, at least in part, in order to be able to test new calculations and processes for preparing electronic documents. As set forth previously, the new calculation data 140 may include a new process or calculation for populating a form associated with an electronic document. The form itself and its requirements may be identical or similar to the requirements for that same form at a time when the prior code data was utilized by the data management system 112 to prepare electronic documents. In this case, the prior code data 144 is used as a basis for comparison to determine if the new calculation data 140 is accurate. If the prior code data was known to be accurate, and the new calculation data 140 provides the same data values for the same historical users as the prior code data, then the new calculation data 140 can be determined to be accurate. Thus, in one embodiment, the prior code database 116 retains the prior code data 144 for testing purposes.

In one embodiment, the data management system 112 retains the prior code data 144 in order to assist in generating a sample test set for testing the new calculation data 140. As will be set forth in more detail below, in one embodiment, the data management system 112 executes the prior code data 144 for a large number of historical users in order to determine what portions of the code were utilized for each of the historical users. In one embodiment, this knowledge is applied to select a sample test set of historical users for testing the new calculation data 140.

In one embodiment, the prior code database 116 retains the prior code data 144 because the data management system still uses the prior code data 144. In this case, the prior code data 144 is also the current code used by the data management system to prepare electronic documents for users of the data management system 112 until new calculations can be devised, tested, and implemented.

In one embodiment, the data management system 112 uses the historical user database 118 to store, gather, or retrieve historical user data 146. The historical user data 146 includes previously prepared documents for a large number of previous users of the data management system 112. The historical user data 146 includes all of the forms that were populated and utilized to prepare electronic documents for each of the historical users. The historical user data 146 includes data values and attributes related to each of the historical users. In various embodiments, the data values and attributes include data provided by the user, data obtained from the user, data related to the user and obtained from third-party sources, and data generated by the data management system 112. The historical user data 146 includes all of the related data used to prepare electronic documents for the historical users. Thus, the historical user data 146 includes data values for all of the variables associated with all of the data values for the lines of the various forms associated with the previously prepared documents.

In one embodiment, the historical user data 146 includes previously prepared electronic documents which were filed with or approved by a government or other institution. In this way, the historical user data 146 can be assured in large part to be accurate and properly prepared, though some of the previously prepared documents will inevitably include errors. The historical user data 146 is utilized in testing the accuracy of the new calculation data 140 as will be set forth in more detail below.

In one embodiment, the data management system 112 is a financial document preparation system. In this case, the historical user data 146 includes historical financial data. The historical financial data includes, for each historical user of the data management system 112, information, such as, but not limited to, a job title, annual income, salary and wages, bonuses, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial document preparation system or in the preparation of financial documents such as a user's tax return and/or any as discussed herein, or as known in the art at the time of filing, or as developed after the time of filing, according to various embodiments.

In one embodiment, the data management system 112 utilizes the prior code execution engine 120 to assist in generating sample test set data for testing new calculations. The prior code execution engine 120 executes the prior code data 144 for the historical user data 146. The data management system 112 analyzes the steps taken by the prior code execution engine 120 in executing the historical user data for each user in order to identify groups of similar historical users based on how the prior code execution engine 120 executed the prior code data 144 for the historical users. The data management system 112 then samples one or more historical users from each group in order to generate the sample test set data 160.

In one embodiment, the prior code execution engine 120 is an instrumented prior code execution engine. As set forth above, the prior code data 144 corresponds to a previous version of software code utilized by the data management system 112, a previous version of the data management system 112, or a separate data management system in order to generate electronic documents for users. The data management system 112, or another data management system from which the prior code data 144 has been obtained, utilized a code execution engine to execute the prior code data 144 in order to generate the electronic documents. The prior code execution engine 120 is an instrumented version of the code execution engine originally utilized to execute the prior code data 144. The prior code execution engine 120 has been instrumented to not only execute the prior code data 144 for each historical user, but to output data indicating which portions of the prior code data 144 were executed for each historical user.

In one embodiment, the prior code execution engine 120 generates trace log data 148 for each historical user. When the prior code execution engine 120 executes the prior code data 144 with historical user data 146 related to a historical user, the prior code execution engine 120 generates trace log data 148 for that historical user. The trace log data 148 indicates which sections of the prior code data 144 were executed by the prior code execution engine 120 for the historical user.

In one embodiment, the prior code data 144 is very complex and may include many millions of lines of software instructions. In one embodiment, for a given calculation, and a given historical user, the prior code execution engine 120 executes only particular sections or lines of the prior code data 144 based on the data values of the variables for the historical user. The attributes of each historical user, in accordance with the prior code data 144, will cause the prior code execution engine 120 to execute certain portions of the prior code data 144 and to not execute certain other portions of the prior code data 144.

In one embodiment, the data management system 112 generates groups of similar historical users based on how the prior code execution engine 120 executes the prior code data 144 from those users. In one embodiment, historical users with similar attributes results in the same or similar sections of the prior code data 144 being executed.

In one embodiment, the prior code execution engine 120 generates, for each historical user, trace log data 148. The trace log data 148 indicates the sections, lines, or portions, of the prior code data 144 that were executed by the prior code execution engine 120. The trace log data 148 indicates the path taken through the prior code data 144 by the prior code execution engine 120 in executing the prior code data 144.

In one embodiment, the trace log data 148 indicates the results of execution of the various lines or sections of code. In one example, a particular portion of the prior code data 144 includes an if-then statement which will be executed based on a characteristic of the historical user has included in the historical user data 146. The trace log data 148 indicates the result of the if-then statement. Furthermore, the next section of code executed by the prior code execution engine 120 depends on the result of the if-then statement. Thus, the trace log data 148 indicates the result of the if-then statement, as well as the next section of code that was executed by the prior code execution engine 120. The prior code data 144 may also contain for loops, do loops, while loops, various logical operators, and many other kinds of software instructions, the execution of which, will depend on the particular attributes of the historical user as indicated by the historical user data 146. The trace log data 148 indicates the results of each operation, as well as the next section of the prior code data 144 executed.

In one embodiment, the trace log data 148 includes section data 150. The section data 150 indicates sections of the prior code data 144 executed by the prior code execution engine 120. As the prior code execution engine 120 executes the prior code data 144, the instrumentation of the prior code execution engine 120 causes the prior code execution engine 120 to generate trace log data 148 including section data 150 indicating each section of the prior code data 144 for that was executed by the prior code execution engine 120.

In one embodiment, the trace log data 148 includes line data 152. In one embodiment, each section of the prior code data 144 includes many lines of code. The line data 152 indicates which lines of a particular section of the prior code data 144 were executed by the prior code execution engine 120.

In one embodiment, the trace log data 148 also indicates data values that were provided or entered for certain lines or sections of code. In one embodiment, the trace log data 148 indicates whether a particular data value provided for a line or section of code is a positive number, zero, blank, or a negative number. The data values can include data values provided by the historical user or calculated by the prior code execution engine 120. In one embodiment, the prior software code includes lines that define a variable as being the smaller, or minimum, of two or more other variables. The trace log data 148 indicates which of the other variables was the minimum for each historical user. In one embodiment, the prior software code includes lines that define a variable as being the larger, or maximum, of two or more other variables. The trace log data 148 indicates which of the other variables was the larger or maximum for each historical user. In one embodiment, when evaluating a less than or equal to operator in the prior code data 144, the trace log data 148 indicates whether a result is true for being less than or true for being equal. In one embodiment, when evaluating a greater than or equal to operator in the prior code data 144, the trace log data 148 indicates whether a result is true for being greater than or true for being equal. In one embodiment, when evaluating the result of an absolute value operator in the prior code data 144, the trace log data 148 indicates whether a value was negative and changed to positive as a result of the absolute value operator, or whether the value was already positive. In one embodiment, when evaluating a Boolean expression in the prior code data 144, the trace log data 148 indicates whether the result of the Boolean expression is true or false for each historical user. In one embodiment, the trace log 148 data indicates these factors and these factors are used to identify unique groups of historical users for the purpose of generating sample test set data. The trace log data can also indicate many other kinds of factors that affect the execution of the code.

In one embodiment, the data management system 112 utilizes the trace log processing module 122 to process the trace log data 148 in order to generate code coverage data 154. The trace log processing module 122 receives the trace log data 148 related to each historical user for which the prior code data 144 was executed by the prior code execution engine 120. The trace log data 148 includes a separate trace log for each historical user. The trace log processing module 122 processes the trace log data 148 for each of the historical users and generates code coverage data 154 indicating the portions of the prior code data 144 that were executed for all of the historical users. In one embodiment, the code coverage data 154 also indicates which data values, or which kinds of data values, were returned or provided for various sections or lines of the prior code data 144 for each of the historical users.

In one embodiment, the code coverage data 154 includes table data. The table data includes a table indicating sections of the prior code data and historical users. The table data indicates which sections of the prior code data 144 were executed for each historical user. Alternatively, or additionally, the code coverage data 154 can include data structures other than tables indicating which portions of the prior code data 144 were executed for the various historical users.

In one embodiment, the trace log processing module 122 generates code coverage representation value data 156. The code coverage representation value data 156 includes, for each historical user, a respective code coverage representation value. The code coverage representation value for a given user is generated based on the lines or sections of the prior software instructions that were executed for that user. Thus, historical users for whom the same lines or sections of the software instructions were executed will have the same code coverage representation value.

In one embodiment, the code coverage representation value is a hash value. Accordingly, the code coverage representation value data 156 includes, for each historical user, a respective hash value. The hash value for a given user is generated based on the lines or sections of the prior software instructions that were executed for that user. Thus, historical users for whom the same lines or sections of the software instructions were executed will have the same hash value.

In one embodiment, the hash value is based on a concatenation of the lines or sections of software instructions that were executed. The trace log processing module 122 concatenates the names of the lines or sections of software instructions that were executed. The trace log processing module 122 then generates the hash value by applying a hash function to the concatenation of the lines or sections of software instructions that were executed for the historical user.

In one embodiment, the hash value is a string of alphanumeric characters generated from a hash function. The hash value can also include nonalphanumeric symbols or characters, in one embodiment.

In one embodiment, storing a hash value for each historical user requires less memory resources than storing the entire list of lines of software instructions that were executed for the historical user. Thus, generating and storing hash values for each of the historical users can provide for the more efficient use of memory and processing resources.

In one embodiment, the code coverage representation value can include a string other than a hash value. The string can be a representation of the lines or sections of code that were executed for the historical user. Those of skill in the art will recognize, in light of the present disclosure, that many other types of code coverage representation values can be utilized in accordance with principles of the present disclosure.

In one embodiment, the code coverage data includes separate code coverage data for each of a plurality of segments of the software instructions. Software instructions for populating an electronic document may involve many separate calculations to populate the various data fields. Each separate calculation corresponds to a particular segment of the software instructions. Each segment of software instructions includes multiple lines or sections of software instructions.

In one embodiment, the code coverage data 154 includes respective code coverage representation value data 156 for each segment of the software instructions. If the prior code data 144 includes ten segments associated with ten separate calculations, then the code coverage representation value data 156 can include ten sets of code coverage representation values, one for each calculation. Each set of code coverage representation values includes a code coverage representation value for each historical user.

In one embodiment, because there is a set of code coverage representation values for each calculation, the data management system 112 can test new calculations quickly and efficiently. When a new calculation is to be tested, the data management system 112 can retrieve the code coverage representation value data 156 or a sample test set generated from the code coverage representation value data 156 associated with that particular calculation, as will be described in more detail below.

In one embodiment, the trace log processing module 122 generates grouping data 158 based on the code coverage representation value data 156. The grouping data 158 includes groups of historical users based on the code coverage representation values. In particular, the grouping data 158 includes a group for each unique code coverage representation value. All of the historical users that have a given code coverage representation value will be sorted into the group associated with that code coverage representation value. Some groups may have many thousands of historical users. Other groups may have a very small number of historical users. Some groups may have only a single historical user.

In one embodiment, the data management system 112 utilizes the trace log processing module 122 to generate grouping data 158 based not only which sections of the prior code data 144 were executed for the historical users, but also based on which data values or types of data values were returned or provided for various lines or sections of the prior code data 144.

In one embodiment, because the code coverage representation values are generated based on the sections or lines of the prior code data each group corresponds to a unique combination of lines or sections of the prior code data 144 executed for one or more historical users. For example, if the code coverage data 154 indicates that there were 1000 unique combinations of sections of the prior code data 144 executed for the historical users, then the grouping data 158 will include 1000 groups.

In one embodiment, the data management system 112 utilizes the sampling module 124 to generate sample test set data 160 from the grouping data 158. The sampling module 124 samples a relatively small number of historical users from each group represented by the grouping data 158. Even though a small number of historical users are sampled, the portion of the historical user data 146 represented by the sample test set data 160 is highly effective for testing the new calculation data 140 because the sample test set data 160 includes historical users from each group represented by the grouping data 158. The manner in which the grouping data 158 is generated ensures that groups are generated for historical users with rare or extreme combinations of attributes, as well as for users with more common combinations of attributes. Because each group includes historical users for whom the prior code execution engine 120 executed the same portions of the prior code data 144, and because the groups taken together represent execution of all of the prior code data 144, sampling a very small number of historical users from each group based on the code coverage representation value data 156 results in sample test set data 160 that is representative of each type of historical user, including historical users with very rare or uncommon attributes.

In one embodiment, the sampling module 124 samples a single user from each group. Because each unique combination of sections of prior code is represented by its own group based on the code coverage representation value data 156, sampling even a single user from each group ensures a sample test set that that can effectively test the new calculation data 140.

In one embodiment, the sampling module 124 generates the sample test set data 160. The sample test set data 160 includes the historical user data 146 related to the historical users sampled from the grouping data 158.

In one embodiment, the testing module 126 is configured to test the new calculation data 140 to determine the accuracy of the new calculation data 140. The testing module 126 receives the new calculation data 140 from the new code database 114. The testing module 126 receives the sample test set data 160 from the sampling module 124. The sample test set data includes those portions of the historical user data 146 associated with the historical users identified in the sample test set data 160. The sample test set data 160 also includes the previously prepared electronic documents identified in the sample test set data 160 and all of the data associated with the previously prepared documents. The testing module 126 then executes the new calculation data 140 with the data values from sample test set data 160 associated with the variable data 142. Executing the new calculation data 140 results in the generation of test data 162. The test data corresponds to those data values that that are generated by the new calculation data 140 based on the data values of the variables from the sample test set data 160 associated with the variable data 142. The testing module 126 then generates results data 164 by comparing the test data 162 to the corresponding data values from the sample test set data. If the test data matches the corresponding data values from the results data 164, then this indicates that the new calculation is accurate.

In one embodiment, the prior code execution engine 120 generates trace log data 148 for each historical user for the entirety of the historical user data 146 related to the historical user. Likewise, the trace log processing module 122 generates code coverage data 154 for the entirety of the trace log data 148 for every historical user. Thus, the code coverage data 154 includes a vast amount of data for all of the historical users and the entirety of the prior code data 144. However, in most circumstances, a new calculation to be tested is related only to a particular part of the prior code data. When the new calculation data 140 is to be tested, the testing need only take place based on the relevant part of the prior code data 144 and the corresponding part of the code coverage data 154.

Accordingly, in one embodiment, the trace log processing module 122 generates the code coverage data 154 in such a way that particular segments or parts of the code coverage data 154 can be separately accessed. The code coverage data 154 includes separate portions for the various parts of the prior code data 144. Thus, when a new calculation is to be tested, the sampling module 124 generates grouping data 158 based only on a relevant part of the code coverage data 154. The sampling module 124 then generates the sample test set data 160 by sampling the grouping data 158. Because the grouping and sampling is performed only for a relevant part of the code coverage data 154, the sampling module 124 can generate the sample test set data 160 for testing the new calculation in an efficient manner from the segmented code coverage data 154.

In one embodiment, the data management system 112 can store the trace log data 148 and code coverage data 154 with a third-party data service provider 170. In one embodiment, the third-party data service provide is a cloud platform service provider. In one embodiment, when the data management system 112 needs sample test set data to test the new calculation, the data management system 112 requests and receives a relevant portion of the code coverage data 154 from the third-party data service provider 170. The sampling module 124 then generates the grouping data 158 and the sample test set data 160 from the portion of the code coverage data 154 obtained from the third-party data service provider 170. Alternatively, the data management system 112 stores and maintains the entirety of the code coverage data 154 in an internal database.

In one embodiment, the data management system 112 utilizes the interface module 128 to enable systems or personnel associated with the data management system 112 to request generation of sample test set data 160 to test the new calculation data 140. When the new calculation is to be tested, a system or individual associated with data management system 112 can enter query data 166 via the interface module 128. The query data 166 indicates a portion of the code coverage data 154 to be retrieved for generation of sample test set data 160. The query data 166 can indicate a particular form or variable related to the new calculation data 140. The data management system 112 then identifies which portion of the code coverage data 154 is relevant to the query data 166. The sampling module 124 receives the relevant portion of the code coverage data 154 and generates the grouping data 158 and the sample test set data 160. The testing module 126 then tests the new calculation data 140 with the sample test set data 160 and generates results data 164. The interface module returns the results data 164 to the system or personnel that originally made the request. In one embodiment, the interface module 128 returns the sample test set data 160 based on the query data 166.

In one embodiment, the preprocessing of the historical user data 146 is performed in two separate steps in order to enable reprocessing, if desired. In the first preprocessing step, the prior code execution engine 120 generates the trace log data 148 by executing the prior version of the code is executed for each of the historical users. The trace log data indicates which lines of the code were executed, how many times a given line of the code was executed, the order in which lines of code were executed, and other information. The trace log data 148 is stored in a database. In one embodiment, the trace log data 148 is stored with the third-party data service provider 170.

In the second preprocessing step, the trace log processing module 122 generates the code coverage data 154 from the trace log data 148. The code coverage data 154 includes the code coverage representation value data 156. The code coverage representation value data is generated for each historical user based on the trace log data and based on selected criteria.

In one embodiment, the two-step preprocessing of the historical user data enables efficient use of memory and processing resources. Executing the prior code data 144 for all of the historical user data 146 is more resource intensive than is generating the code coverage data 154. Accordingly, generating the trace log data 148 occurs only a single time.

After the trace log data 148 has been generated, the code coverage data 154 can be generated multiple times if desired.

In one embodiment, the preprocessing of the trace log data 148 enables the trace log processing module 122 to generate code coverage representation value data 156 based on selected criteria. This means that code coverage representation value data can be generated having a selected resolution or level of detail. For greater resolution, the code coverage representation value data can be generated based on each line of the code that was executed for a historical user. For a lower level of resolution, the code coverage representation value can be generated only based on whether certain types of lines or sections of code were executed.

In one embodiment, the trace log processing module 122 generates the code coverage representation value data 156 from the trace log data 148 based only on the variable assignment lines of code in which a value of a variable is assigned. In the prior code data, some lines of code assign the value of a variable such as an integer, the floating-point values, string, or other types of values. The trace log processing module 122 can ignore other types of lines of code when generating the code coverage representation value data 156 and can instead generate the code coverage representation value data 156 entirely on which variable assignment lines of code were executed.

In one embodiment, the code coverage representation value can be generated only based on branches taken during execution of the prior software instructions. For example, the software instructions can include various if-then statements, for loops, do loops, while loops, and other software instruction structures that determine what branches of the software instructions will be executed. The trace log processing module 122 can generate the code coverage representation value data 156 based on the results of the if then statements, whether loops were executed, how loops were executed, or other ways in which various branches of software instructions can be taken.

In one embodiment, the code coverage representation value data 156 can be generated based on not only which lines of software instructions were executed, the how many times various lines of software instructions were executed. In one embodiment, the code coverage representation value data 156 is generated based on whether a line of software instructions was executed, whether a line of software instructions was executed a single time, or whether a line of software instructions was executed more than one time. Thus, rather than indicating the exact number of times a line was executed, the trace log processing module 122 treats all numbers greater than one as being the same with regards to generating the code coverage representation value data 156.

Generating the code coverage representation value based on only certain types of lines of code can further reduce the computing, memory, and data transmission resources utilized in generating the code coverage representation value data with respect to an example in which the code coverage representation value data is generated based on every executed line of code.

In one embodiment, the data management system 112 is a tax return preparation system. The historical user data 146 includes, for a plurality of historical users of the tax return preparation system, all of the data utilized by the tax return preparation system to generate the tax returns for the users. To prepare a tax return for a user, the tax return preparation system utilizes a large amount of data related to the user, as well as a large number of tax related forms. The tax forms can include government issued tax forms, government issued worksheets for filling out other tax forms, internal tax forms, internal worksheets for filling out tax forms, and other kinds of tax forms. When the tax return preparation system prepares a tax return for a user, the tax return preparation system utilizes various tax forms. The historical user data 146 includes, for each historical user, all of the tax forms utilized to prepare the tax return for the historical user, as well as all of the data related to the tax return and utilized by the tax return preparation system to prepare the various tax forms. When the tax return preparation system prepares a tax return for a user, the tax return preparation system executes various sections of the prior code data 144 based on the tax forms utilized by the user and the particular attributes of the user as reflected in the historical user data.

In one embodiment, the tax return preparation system utilizes the prior code execution engine 120 to execute the prior code data 144 for each historical user. For each historical user, the prior code execution engine 120 receives the historical user data 146 related to the historical user. The prior code execution engine 120 then executes the prior code data 144 for each historical user data 146 related to the historical user. Executing the historical user data 146 for a historical user results in the reproduction of the previously prepared tax return of the historical user. The prior code execution engine 120 also generates trace log data 148 for each historical user. The trace log data 148 for a historical user indicates which portions of the prior code data 144 were executed for the historical user. The trace log data 148 for the historical user is, in one embodiment, several megabytes in size.

In one embodiment, the historical user data 146 includes, for each user, tax related attributes of the historical users. If a form included in the historical user data 146 for a user indicates that the user has 0 dependents, then the prior code data 144 will cause the prior code execution engine 120 to execute different portions of the prior code data 144 than would be executed for a user that has four dependents. Likewise, various income values, home ownership, marital status, employment status, and many other kinds of tax related attributes can cause the prior code execution engine 120 to execute different parts of the prior code data 144.

In one embodiment, the trace log processing module 122 generates code coverage data 154 by processing the trace log data 148 for each historical user. The code coverage data 154 indicates which portions of the prior code data 144 were executed for each historical user. The code coverage data 154 includes code coverage representation value data 156. The code coverage representation value data 156 includes a code coverage representation value for each historical user based on which lines or sections of the prior code data 144 were executed for the historical user.

In one embodiment, the trace log processing module 122 generates grouping data 158 including a group for each unique code coverage representation value. The historical users are sorted into the groups associated with their code coverage representation values.

In one embodiment, the new calculation data 140 can correspond to a new tax calculation to be tested. The new tax calculation can correspond to a new calculation for populating a new tax form, for populating a portion of the new tax form, or for populating a particular line of a new tax form. Only certain parts of the code coverage data 154 are relevant to the new calculation. Accordingly, a system or individual associated with the data management system 112 inputs query data 166 to the interface module 128 indicating the part of the code coverage data 154 from which sample test set data 160 should be generated. The tax return preparation system requests and receives the relevant portion of the code coverage data 154 from the third-party data service provider 170, or from an internal database. The sampling module 124 receives only that portion of the code coverage data 154 that corresponds to the query data 166. The sampling module 124 generates the sample test set data 160 from the part of the code coverage data 154 that is relevant to the query data 166, rather than from the entirety of the code coverage data 154. In particular, the sampling module 124 samples one or more historical users from each group for the code coverage representation value data 156 associated only with the new calculation. In this way, the tax return preparation system efficiently utilizes system resources in generating sample test set data 160 for testing the new calculation data 140.

In one embodiment, the prior code execution engine 120 includes an instrumented run-time engine. In one embodiment, the prior code execution engine includes an instrumented compiler.

In one embodiment, the data management system 112 is an electronic document preparation system that assists users to prepare electronic documents. Each segment of the prior code data can correspond to a calculation or process for populating one or more data fields of one or more forms of an electronic document. The electronic document preparation system can receive a new calculation or process for populating one or more data fields. The electronic document preparation system generates a sample test set for the new calculation or process by analyzing the code coverage data associated with the corresponding calculation or process utilized by the prior code data 144.

In one example, in accordance with one embodiment, the data management system is a tax return preparation system. Given that the data management system 112 has approximately 40 million historical user data files for personal tax returns, more than 2000 forms represented in the code base, and a fairly large number of instrumented functions, the total number of lines generated by the instrumented tax return preparation engine is fairly large. Once the raw data for each user is saved into a single file, the next phase of the off-line process is to transform these data rows into a single line representing the behavior of a single user (data) in a single code segment, across all ~40M log files. In one example, many tax forms translate to 10 to 200+ different segments in the code base.

In one embodiment, the data needs to be parallelized due to large number of data files/rows. In order to transform multiple lines per segment into a single hash, the data management system utilizes a map reduce web service to create a mapping. The data management system 112 employs a cluster of 30 to 60 servers to process 250K-400K historical users at a time. This chunking provides small enough number of files to be stored in comma separated values (CSV) format that can be quickly uploaded into a data storage and query service. When a set of historical user id files is processed, they are 'partitioned' into sections to enable fast structured query language (SQL) queries. Python code can enable this in some map reduce services. Such Python code can include loading a set of files of suitable size for processing with 30-60 server instances, capping the number of line visits at 2 (which corresponds to 'multiple entry'), and concatenating all lines in a section in to a single string before creating a single hash value per (userid, segment pair). A final step in the map reduce process can slice the rows per form and segment and save it in comma separated format. The input data files can contain information about each historical user. However, after processing, output data files are grouped/partitioned by form and segment, which may require careful tracking of which user data file has been processed. In case of an error, re-processing a specific user id is not a simple task once the results for a specific user has been processed by the map reduce service and uploaded to a data storage and query service bucket in files representation section partitions. In one embodiment, the data flow employs a no SQL database table to make sure that each data file is tracked in the flow properly. In the map reduce system, each data set of 250-400K historical users is processed in 10-20 minutes depending on the number of rows. Once, every historical user's data file is processed with the core engine and trace logs (per user) are uploaded into the query service, the map reduce process can be run separately. Saving the raw data enables the data management system 112 to re-process it to generate a different footprint i.e. hash value per historical user per segment if there is a need. In one embodiment, the data management system 112 takes advantage of this two-step processing model to create different 'tiers', which are different ways of selecting log lines in the raw data to construct the hash function input.

In one embodiment, all the lines that were traced are taken into account while generating the hash values. A tier can be created where all branches, math functions, decisions are represented. This tier gives significant reduction over our earlier method of statistical sampling (based on distribution of values for each line of the form). For an average tax form, there are multiple orders of reduction in sample test set data size using this tier.

In one embodiment, although the above described tier is very good for automated regression tests and guarantees tracking of every important method/branch/decision, the size of the test set is not always useful for quick debugging/testing, especially during the re-platforming process. Analysts may need smaller set to quickly identify potential errors. For this, analysts can select the type of code coverage data they are interested in (branches only, or only assignment lines, or only a specific function), and filter the trace logs accordingly before generating the representative hash for (user, segment) pairs. By limiting the lines included in the hash, the test set number can be reduced significantly, in many cases multiple orders of magnitude.

In one embodiment, the hash value data can be based on only assignment lines or only the branch conditions. It is possible to visualize these different tiers as the interest to track different instructions or phases of the code base. For example, if analysts are looking at an 'assignment only' tier (containing only code lines where an assignment occurs), they are not interested in understanding why a specific 'if-else' branch has been taken, rather they want to know if a value is assigned as positive/negative/zero, etc. Different tiers with significantly smaller test sets, while still guaranteeing full coverage for the instructions of interest, enables quick checks for sanity and fast debugging. Analysts, i.e. system developers that are involved in or oversee the re-platforming process, then can expand to more complete tiers. Note that data for all tiers that have been listed are returned by our service at the same time. Once the trace log data is processed by the map reduce system, it resides in a data storage service bucket, distributed into in multiple folders partitioned by code sections. The data files are comma-separate rows that include the following data: The number of files depends on the data chunks that enters the map reduce service processing at every step. In one embodiment, there can be 100 to 300 files with number of rows ranging from 10K to 450K for each code section. This data is surfaced as a SQL table by using a query service, which enables the data management system to create meta data definitions by pointing it to the bucket containing all the data for a single fiscal year.

In one embodiment, incoming queries that are trying to find a useful sample of data files with optimal coverage does not have the sections of code defined. The data management system 112 can take the queries which include the list of (form, line) pairs of interest, and transform them by mapping (form, line) pair into a single code section. An earlier simple analysis of the code base provides this mapping which is kept in memory.

In one embodiment, the list of segments needed for query is obtained, the table is used to ask for a list of all historical users that are associated with these segments. The list of user ids for a list of segments could be extremely long. For example, if there is a segment in the code that checks the social security number (SSN) of the filer, this segment will be visited by all users and returns a very large set of historical users.

In one embodiment, the list of user ids for each segment is then grouped by their hash values. Since each hash value indicates a unique behavior (or set of branches, or business logic) in our code, only one id from each group is needed for complete sample test set data. For multiple segment, hashes of hashes can be created to find unique groups of behavior combinations. This greatly reduces the number of files that needs to be tested or rerun, automatically or manually. The reduction in the number of test files directly affects the development time for a re-platforming effort.

In one embodiment, a new hash value is generated for the given set of segments of interest, then combined on the server side: The queries into query service usually return under 2 minutes. The longest query recorded is 1 min 50 secs for 37 code segments. Creation of test set groups based on hashes returned is a simple step carried out on the server side.

In one embodiment, during the off-line processing phase, the data goes through the following transformations, all carried out in parallel: Download, unzip, and decryption of data files, such as XML files, in one example; minor edit for re-processing; upload of data file; upload of financial definition file for federal and state forms into instrumented engine, calculations run and generation of trace logs; clean up, debug and upload of trace logs to a data storage and query platform; hash generation for final data, partitioned by year, fed/state, form, segment (for multiple tiers).

In one embodiment, during online processing, the following steps are taken: check submitted payload and record in task database; in background, map payload to segment query and send to a query service; the query service loads required (partitioned segment) files into memory and runs the query; receive resulting data from the data; generate groups (and create additional tiers, such as tiers in which combinations of lines or sections are disregarded); save results in the data storage service and serve client. Subsequent queries that carry the same payload can be served from cache/memory.

FIG. 2 is a representation of a code coverage table 200, according to one embodiment. Referring now to FIG. 1, the discussion related to FIG. 1, and FIG. 2, the code coverage table 200 represents a part of the code coverage data 154. In particular, the code coverage table 200 is an example of table data from the code coverage data 154. The code coverage table 200 corresponds to a part of the code coverage data 154 that is relevant to a new calculation to be tested, and for which sample test set data 160 has been requested.

The code coverage table 200 is in the form of a matrix, according to one embodiment. The rows of the matrix correspond to sections of the prior code data 144 that are relevant to the new calculation to be tested. The sections of the prior code data 144 can correspond to sections of the prior code data 144 that are related to a particular tax form for which a new calculation is being tested. In the example of the code coverage table 200, there are M sections of code. The columns of the code coverage table 200 correspond to historical users of the data management system 112. In the example of the code coverage table 200, there are N historical users in the code coverage data 154. In various embodiments, the value of N may be as large as several million.

In one embodiment, the values in each data field indicate whether or not the corresponding code section was executed for the corresponding historical user. In the example of the code coverage table 200, a value of 0 indicates that the code section was not executed or visited for that historical user. A value of 1 indicates that the code section was executed or visited for that historical user. In one embodiment, the data values other than 0 and 1 can be utilized in the data fields of the code coverage table 200. For example, data values can be utilized to indicate how many times a code section was executed for a particular user. This is quite useful because some sections of code may be executed many times for a single user. The code coverage data can indicate whether a given section was executed more than once.

In one embodiment, the trace log processing module 122 generates code coverage representation value data 156 including a respective hash value for each historical user. The hash value is generated by applying a hash function to the sections of code that were executed for the historical user. The hash value characterizes the historical user associated with the column. Thus, each historical user is represented by a hash value that indicates the sections of the prior code data 144 that were executed for the user. In one embodiment, the trace log processing module 122 generates the grouping data 158 by identifying identical hash values from the code coverage representation value data 156 and grouping the historical users accordingly. Each unique hash value represented in the table data 200 corresponds to a group in the grouping data 158. Each historical user is sorted into the group corresponding to the hash value representing the historical user. In the example of the code coverage table 200, historical user 2 and historical user 5 have identical hash values and will belong the same group.

In one embodiment, the sampling module generates the sample test set data 160 by sampling one or more historical users from each group from the grouping data 158. The sampling module 124 then passes the sample test set data 160 back to the interface module 128 or directly to the testing module 126 so that the new calculation can be tested.

FIG. 3 is a representation of a code coverage table 300, according to one embodiment. With reference to FIG. 1, the discussion related to FIG. 1, to FIG. 2, the discussion related to FIG. 2, and FIG. 3, the code coverage table 300 represents a part of the code coverage data 154. In particular, the code coverage table 300 is an example of table data from the code coverage data 154. The code coverage table 300 corresponds to a part of the code coverage data 154 that is relevant to a new calculation to be tested, and for which sample test set data 160 has been requested.

The code coverage table 300 is in the form of a matrix, according to one embodiment. The rows of the matrix correspond to lines of the prior code data 144 that are relevant to the new calculation to be tested. The lines of the prior code data 144 correspond to line of the prior code data 144 that are related to a particular tax form for which a new calculation is being tested. In the example of the code coverage table 300, there are N lines of code. The columns of the code coverage table 300 corresponds to historical users of the data management system 112. In the example of the code coverage table 300, there are N historical users in the code coverage data 154.

In one embodiment, the values in each data field indicate whether or not the corresponding line of code was executed for the corresponding historical user. In the example of the code coverage table 300, a value of 0 indicates that the line of code was not executed for that historical user. A value of 1 indicates that the line of code was executed for that historical user. In one embodiment, the data values other than 0 and 1 can be utilized in the data fields of the code coverage table 300. For example, data values can be utilized to indicate how many times a line of code was executed for a particular user. This is quite useful because some lines of code may be executed many times for a single user. The code coverage data can indicate whether a given line of code was executed more than once.

In one embodiment, the trace log processing module 122 generates code coverage representation value data 156 including a respective hash value for each historical user. The hash value is generated by applying a hash function to the lines of code that were executed for the historical user. The hash value characterizes the historical user associated with the column. Thus, each historical user is represented by a hash value that indicates the lines of the prior code data 144 that were executed for the user. In one embodiment, the trace log processing module 122 generates the grouping data 158 by identifying identical hash values from the code coverage representation value data 156 and grouping the historical users accordingly. Each unique hash value represented in the table data 300 corresponds to a group in the grouping data 158. Each historical user is sorted into the group corresponding to the hash value representing the historical user. In the example of the code coverage table 300, historical user 5 and historical user N have identical hash values and will belong the same group.

Embodiments of the present disclosure overcome the drawbacks of traditional data management systems that generate sample test set data by taking a random sample of the entire group of historical users, resulting in the high likelihood that historical users with very rare combinations of attributes will not be present in the sample test set data. Calculating and storing the hash values utilizes significantly less memory and processing resources than storing the entirety of data indicating which lines or sections of code were executed for each historical user. Embodiments of the present disclosure also overcome the drawbacks of traditional data management systems that generate sample test set data including a very large number of historical users in order to increase the likelihood that historical users with rare attributes will be represented. Embodiments of the present disclosure overcome these drawbacks by providing a very small yet sufficient sample of historical users that will include all types of historical users based on analysis of previous versions of software code executed from the historical users.

FIG. 4 is a representation of a code coverage table 400, according to one embodiment. With reference to FIGS. 1-4, and the discussion related to FIGS. 1-3 above, the code coverage table 400 represents a part of the code coverage data 154. In the example of FIG. 4, a developer or analyst has elected to generate or retrieve a sample test set having a lower resolution than in FIG. 3. In particular, rather than checking to see whether each line of code in a segment was executed, the develop has selected to retrieve a sample test based on only certain selected lines of code. The code coverage representation data 156 is generated based only on the certain selected lines of code. The selected lines of code could include variable assignment lines of code, or other types of lines of code.

In one embodiment, the data management system 112 generates multiple tiers of code coverage data 154 for each segment of the prior code data. A higher resolution tier could be based on every line of code in a given segment. Lower resolution tiers could be based only on selected subsets of the lines of code. The fewer lines of code in a subset, the lower the resolution of the sample test set generated therefrom. For, each tier related to a given segment, the code coverage data 154 stores code coverage representation value data 156 and grouping data 158. Sample test set data 160 can be generated from whichever resolution tier is selected by a developer or tester. Because the various tiers are all pre-generated and stored, sample test sets of varying resolution can be generated or retrieved rapidly upon request.

Embodiments of the present disclosure overcome the drawbacks of traditional data management systems that generate sample test set data by taking a random sample of the entire group of historical users, resulting in the high likelihood that historical users with very rare combinations of attributes will not be present in the sample test set data. Calculating and storing the code coverage representation values utilizes significantly less memory and processing resources than storing the entirety of data indicating which lines or sections of code were executed for each historical user. Embodiments of the present disclosure also overcome the drawbacks of traditional data management systems that generate sample test set data including a very large number of historical users in order to increase the likelihood that historical users with rare attributes will be represented. Embodiments of the present disclosure overcome these drawbacks by providing a very small yet sufficient sample of historical users that will include all types of historical users based on analysis of previous versions of software code executed from the historical users.

Figure 5:
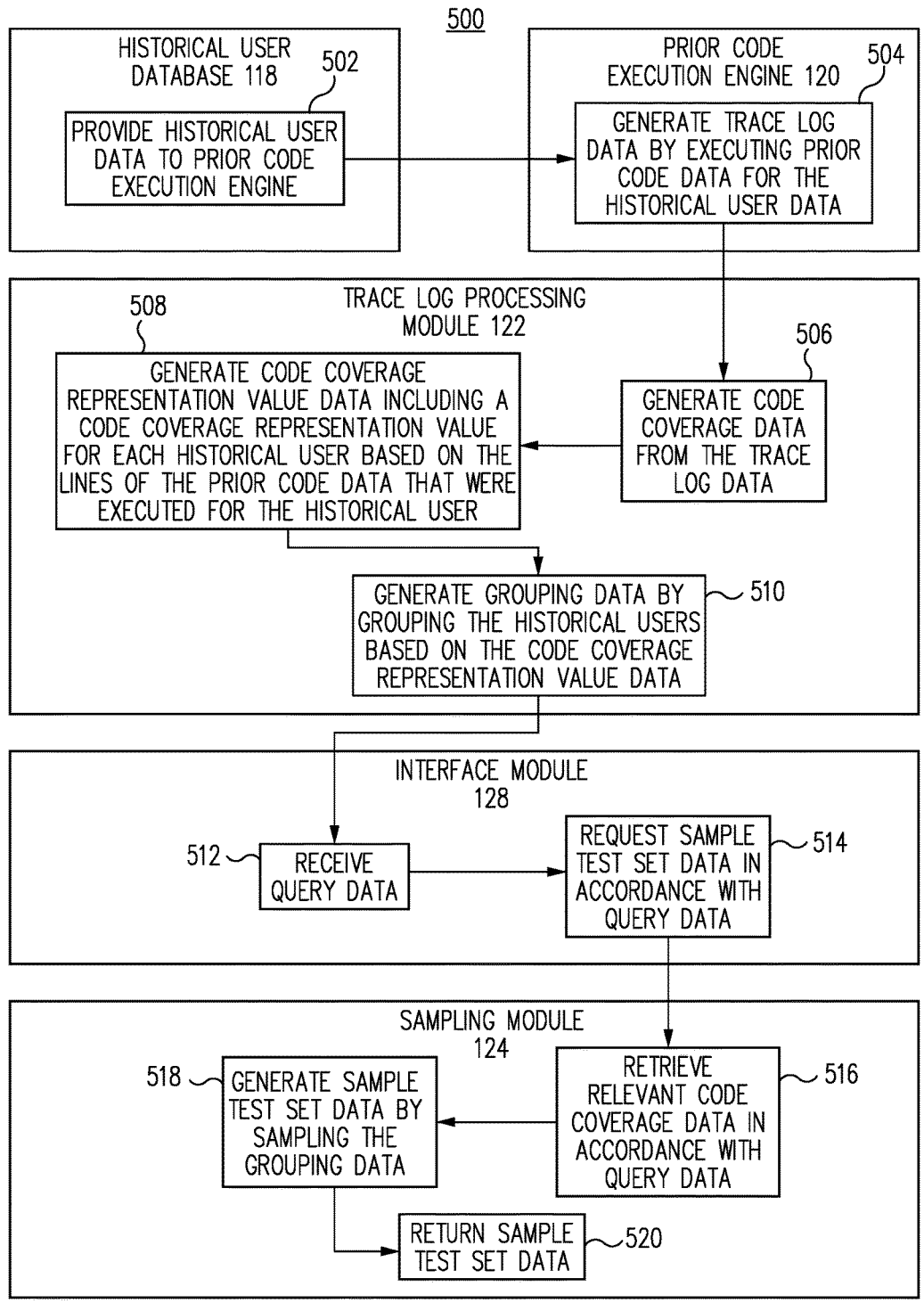
FIG. 5 is a functional flow diagram of a process for generating efficient sample sets for testing new data management processes for a data management system, in accordance with one embodiment.

FIG. 5 illustrates a functional flow diagram of a process 500 for generating efficient sample sets for testing new data management processes for a data management system, in accordance with various embodiments.

Referring to FIG. 5, FIGS. 1-4, and the descriptions of FIGS. 1-4 above, at block 502, the historical user database 118 provides historical user data to the prior code execution engine 120, using any of the methods, processes, and procedures discussed above with respect to FIGS. 1-4, according to one embodiment. From block 502 the process proceeds to block 504.

At block 504, the prior code execution engine 120 generates trace log data by executing prior code data for the historical user data, using any of the methods, processes, and procedures discussed above with respect to FIGS. 1-4, according to one embodiment. From block 504 the process proceeds to block 506.

At block 506, the trace log processing module 122 generates code coverage data from the trace log data, using any of the methods, processes, and procedures discussed above with respect to FIGS. 1-4, according to one embodiment. From block 506 the process proceeds to block 508.

At block 508, the trace log processing module 122 generates code coverage representation value data including a code coverage representation value for each historical user based on the lines of the prior code data that were executed for the historical users, using any of the methods, processes, and procedures discussed above with respect to FIGS. 1-4, according to one embodiment. From block 508 the process proceeds to block 510.

At block 510 the sampling module 124 generates grouping data by grouping the historical users based on the code coverage representation value data, using any of the methods, processes, and procedures discussed above with respect to FIGS. 1-4, according to one embodiment. From block 510 the process proceeds to block 512.

At block 512 the interface module 128 receives query data requesting sample test set data for testing the new calculation, using any of the methods, processes, and procedures discussed above with respect to FIGS. 1-4, according to one embodiment. From block 512 the process proceeds to block 514.

At block 514 the interface module 128 requests sample test set data in accordance with the query data, using any of the methods, processes, and procedures discussed above with respect to FIGS. 1-4, according to one embodiment. From block 514 the process proceeds to block 516.

At block 516 the sampling module 124 retrieves relevant code coverage data in accordance with the query data, using any of the methods, processes, and procedures discussed above with respect to FIGS. 1-4, according to one embodiment. From block 516 the process proceeds to block 518.

At block 518, the sampling module 124 generates sample test set data by sampling the grouping data, using any of the methods, processes, and procedures discussed above with respect to FIGS. 1-4, according to one embodiment. From block 518 the process proceeds to block 520.

At block 520 the sampling module 124 returns the sample test set data, using any of the methods, processes, and procedures discussed above with respect to FIGS. 1-4, according to one embodiment. The sampling module 124 returns the sample test set data to the interface module 128 or to the testing module 126.

Those of skill in the art will recognize, in light of the present disclosure, that the process 500 can include different steps, different orders of steps, and steps performed by modules other than those represented in FIG. 5. All such other processes fall within the scope of the present disclosure.

Figure 6:
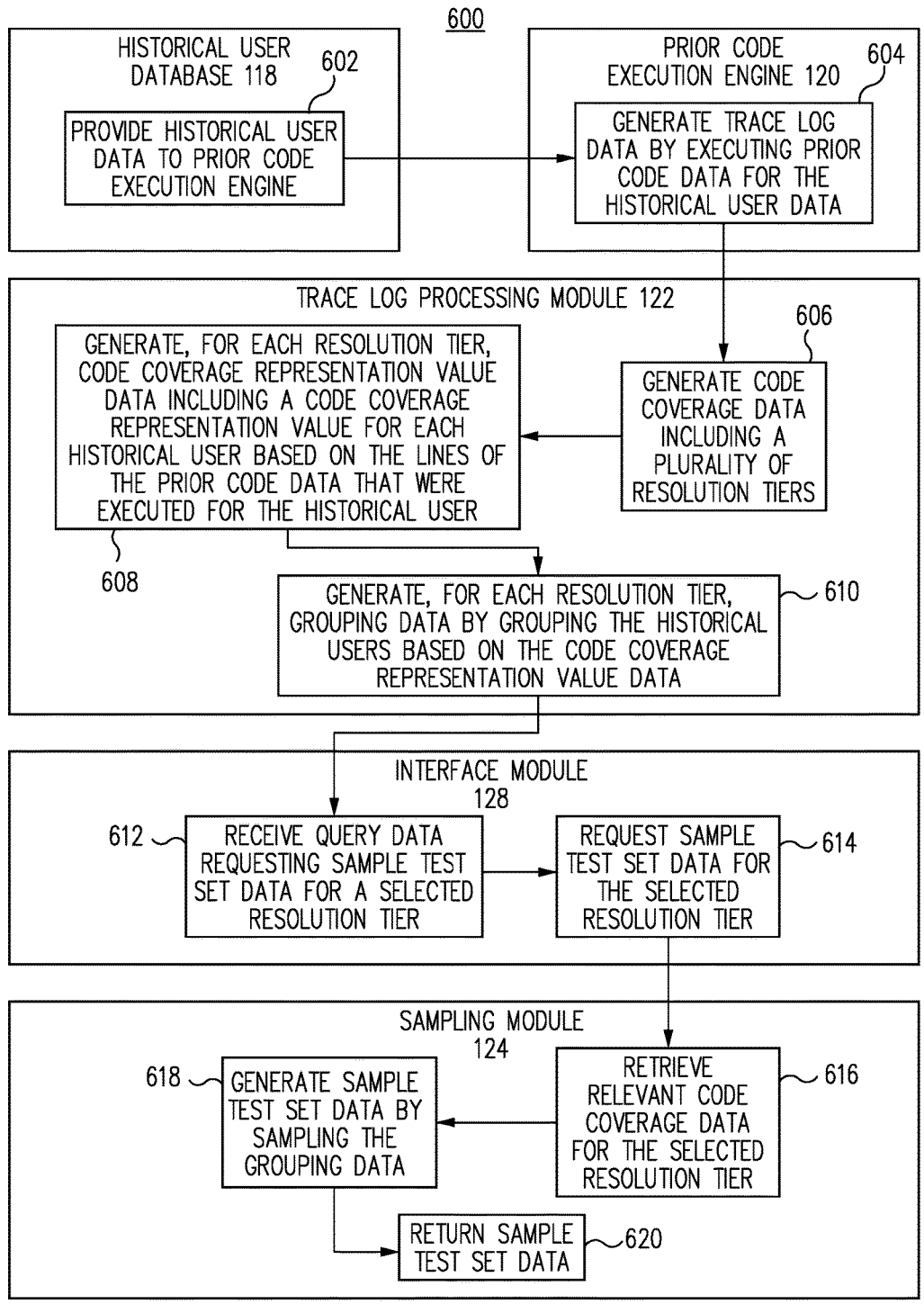
FIG. 6 is a functional flow diagram of a process for generating efficient sample sets for testing new data management processes for a data management system, in accordance with one embodiment.

FIG. 6 illustrates a functional flow diagram of a process 600 for generating efficient sample sets for testing new data management processes for a data management system, in accordance with various embodiments.

Referring to FIG. 6, FIGS. 1-5, and the descriptions of FIGS. 1-5 above, and FIG. 6, at block 602, the historical user database 118 provides historical user data to the prior code execution engine 120, using any of the methods, processes, and procedures discussed above with respect to FIGS. 1-5, according to one embodiment. From block 602 the process proceeds to block 604.

At block 604, the prior code execution engine 120 generates trace log data by executing prior code data for the historical user data, using any of the methods, processes, and procedures discussed above with respect to FIGS. 1-5, according to one embodiment. From block 604 the process proceeds to block 606.

At block 606, the trace log processing module 122 generates code coverage data including a plurality of resolution tiers, using any of the methods, processes, and procedures discussed above with respect to FIGS. 1-5, according to one embodiment. From block 606 the process proceeds to block 608.

At block 608, the trace log processing module 122 generates, for each resolution tier, code coverage representation value data including a code coverage representation value for each historical user based on the lines of the prior code data that were executed for the historical users, using any of the methods, processes, and procedures discussed above with respect to FIGS. 1-5, according to one embodiment. From block 608 the process proceeds to block 610.

At block 610 the sampling module 124 generates, for each resolution tier, grouping data by grouping the historical users based on the code coverage representation value data, using any of the methods, processes, and procedures discussed above with respect to FIGS. 1-5, according to one embodiment. From block 610 the process proceeds to block 612.

At block 612 the interface module 128 receives query data requesting sample test set data for a selected resolution tier, using any of the methods, processes, and procedures discussed above with respect to FIGS. 1-5, according to one embodiment. From block 612 the process proceeds to block 614.

At block 614 the interface module 128 requests sample test set data for the selected resolution tier, using any of the methods, processes, and procedures discussed above with respect to FIGS. 1-5, according to one embodiment. From block 614 the process proceeds to block 616.

At block 616 the sampling module 124 retrieves relevant code coverage data for the selected resolution tier, using any of the methods, processes, and procedures discussed above with respect to FIGS. 1-5, according to one embodiment. From block 616 the process proceeds to block 618.

At block 618, the sampling module 124 generates sample test set data by sampling the grouping data, using any of the methods, processes, and procedures discussed above with respect to FIGS. 1-5, according to one embodiment. From block 618 the process proceeds to block 620.

At block 620 the sampling module 124 returns the sample test set data, using any of the methods, processes, and procedures discussed above with respect to FIGS. 1-5, according to one embodiment. The sampling module 124 returns the sample test set data to the interface module 128 or to the testing module 126.

Those of skill in the art will recognize, in light of the present disclosure, that the process 600 can include different steps, different orders of steps, and steps performed by modules other than those represented in FIG. 6. All such other processes fall within the scope of the present disclosure.

Figure 7:
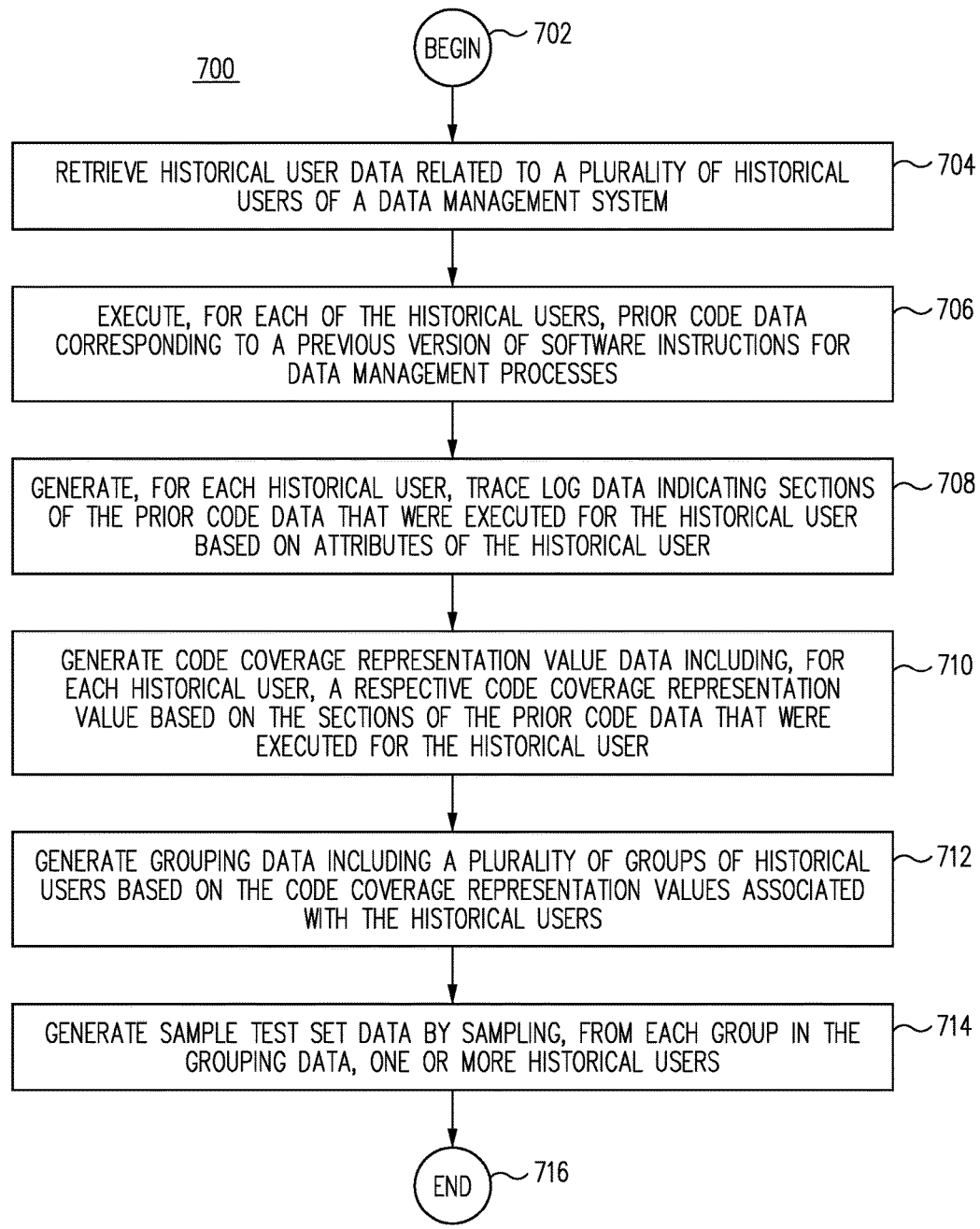
FIG. 7 is a flow diagram of a process for generating efficient sample sets for testing new data management processes for a data management system, in accordance with one embodiment.

FIG. 7 illustrates a flow diagram of a process 700 for generating efficient sample sets for testing new data management processes for a data management system, in various embodiments.

Referring to FIG. 7, FIGS. 1-6, and the description of FIGS. 1-6 above, in one embodiment, process 700 begins at BEGIN 702 and process flow proceeds to RETRIEVE HISTORICAL USER DATA RELATED TO A PLURALITY OF HISTORICAL USERS OF A DATA MANAGEMENT SYSTEM 704.

In one embodiment, at RETRIEVE HISTORICAL USER DATA RELATED TO A PLURALITY OF HISTORICAL USERS OF A DATA MANAGEMENT SYSTEM 704, historical user data is retrieved related to a plurality of historical users of a data management system, using any of the methods, processes, and procedures discussed above with respect to FIGS. 1-6

In one embodiment, once historical user data is retrieved related to a plurality of historical users of a data management system at RETRIEVE HISTORICAL USER DATA RELATED TO A PLURALITY OF HISTORICAL USERS OF A DATA MANAGEMENT SYSTEM 704 process flow proceeds to EXECUTE, FOR EACH OF THE HISTORICAL USERS, PRIOR CODE DATA CORRESPONDING TO A PREVIOUS VERSION OF SOFTWARE INSTRUCTIONS FOR DATA MANAGEMENT PROCESSES 706.

In one embodiment, at EXECUTE, FOR EACH OF THE HISTORICAL USERS, PRIOR CODE DATA CORRESPONDING TO A PREVIOUS VERSION OF SOFTWARE INSTRUCTIONS FOR DATA MANAGEMENT PROCESSES 706, prior code data is executed, for each of the historical users, corresponding to a previous version of software instructions for data management processes, using any of the methods, processes, and procedures discussed above with respect to FIGS. 1-6

In one embodiment, once prior code data is executed, for each of the historical users, corresponding to a previous version of software instructions for data management processes at 706, process flow proceeds to EXECUTE, FOR EACH OF THE HISTORICAL USERS, PRIOR CODE DATA CORRESPONDING TO A PREVIOUS VERSION OF SOFTWARE INSTRUCTIONS FOR DATA MANAGEMENT PROCESSES 708.

In one embodiment, at GENERATE, FOR EACH HISTORICAL USER, TRACE LOG DATA INDICATING SECTIONS OF THE PRIOR CODE DATA THAT WERE EXECUTED FOR THE HISTORICAL USER BASED ON ATTRIBUTES OF THE HISTORICAL USER 708, trace log data is generated, for each historical user, trace log data indicating sections of the prior code data that were executed for the historical user based on attributes of the historical user, using any of the methods, processes, and procedures discussed above with respect to FIGS. 1-6

In one embodiment, once trace log data is generated, for each historical user, trace log data indicating sections of the prior code data that were executed for the historical user based on attributes of the historical user at GENERATE, FOR EACH HISTORICAL USER, TRACE LOG DATA INDICATING SECTIONS OF THE PRIOR CODE DATA THAT WERE EXECUTED FOR THE HISTORICAL USER BASED ON ATTRIBUTES OF THE HISTORICAL USER 708, process flow proceeds to GENERATE CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE PRIOR CODE DATA THAT WERE EXECUTED FOR THE HISTORICAL USER 710.

In one embodiment, at GENERATE CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE PRIOR CODE DATA THAT WERE EXECUTED FOR THE HISTORICAL USER 710, code coverage representation value data is generated including, for each historical user, a respective code coverage representation value based on the sections of the prior code data that were executed for the historical user, using any of the methods, processes, and procedures discussed above with respect to FIGS. 1-6

In one embodiment, once code coverage representation value data is generated including, for each historical user, a respective code coverage representation value based on the sections of the prior code data that were executed for the historical user at GENERATE CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE PRIOR CODE DATA THAT WERE EXECUTED FOR THE HISTORICAL USER 710, process flow proceeds to GENERATE GROUPING DATA INCLUDING A PLURALITY OF GROUPS OF HISTORICAL USERS BASED ON THE CODE COVERAGE REPRESENTATION VALUES ASSOCIATED WITH THE HISTORICAL USERS 712.

In one embodiment, at GENERATE GROUPING DATA INCLUDING A PLURALITY OF GROUPS OF HISTORICAL USERS BASED ON THE CODE COVERAGE REPRESENTATION VALUES ASSOCIATED WITH THE HISTORICAL USERS 712, grouping data is generated including a plurality of groups of historical users based on the code coverage representation values associated with the historical users, using any of the methods, processes, and procedures discussed above with respect to FIGS. 1-6

In one embodiment, once grouping data is generated including a plurality of groups of historical users based on the code coverage representation values associated with the historical users at GENERATE GROUPING DATA INCLUDING A PLURALITY OF GROUPS OF HISTORICAL USERS BASED ON THE CODE COVERAGE REPRESENTATION VALUES ASSOCIATED WITH THE HISTORICAL USERS 712, process flow proceeds to GENERATE SAMPLE TEST SET DATA BY SAMPLING, FROM EACH GROUP IN THE GROUPING DATA, ONE OR MORE HISTORICAL USERS 714.

In one embodiment, at GENERATE SAMPLE TEST SET DATA BY SAMPLING, FROM EACH GROUP IN THE GROUPING DATA, ONE OR MORE HISTORICAL USERS 714, sample test set data is generated by sampling, from each group in the grouping data, one or more historical users, using any of the methods, processes, and procedures discussed above with respect to FIGS. 1-6

In one embodiment, once sample test set data is generated by sampling, from each group in the grouping data, one or more historical users at GENERATE SAMPLE TEST SET DATA BY SAMPLING, FROM EACH GROUP IN THE GROUPING DATA, ONE OR MORE HISTORICAL USERS 714, process flow proceeds to END 716.

In one embodiment, at END 716 the process 700 for generating efficient sample sets for testing new data management processes for a data management system is exited to await new data and/or instructions.

Figure 8:
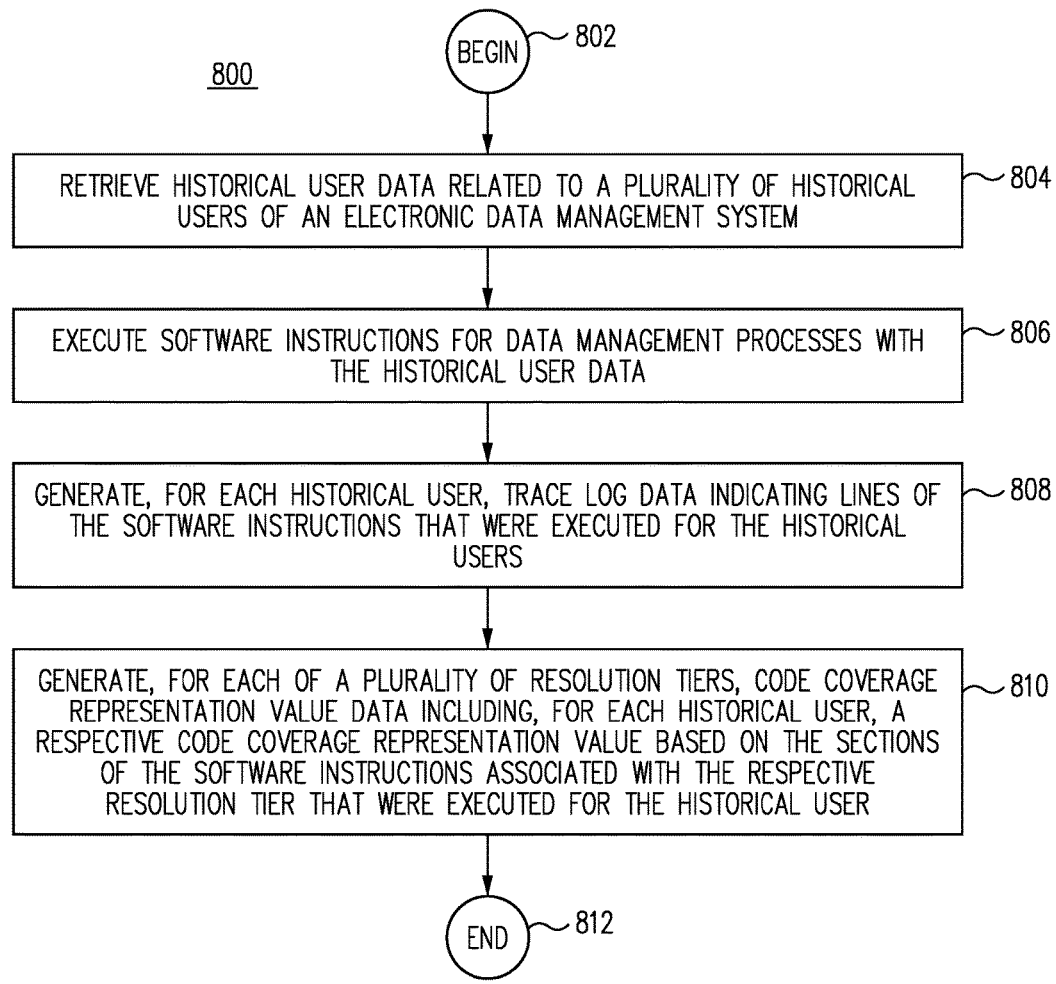
FIG. 8 is a flow diagram of a process for generating efficient sample sets for testing new data management processes for a data management system, in accordance with one embodiment.

FIG. 8 illustrates a flow diagram of a process 600 for generating efficient sample sets for testing new data management processes for a data management system, in various embodiments.

Referring to FIG. 8, FIGS. 1-6, and the description of FIGS. 1-6 above, in one embodiment, process 800 begins at BEGIN 802 and process flow proceeds to RETRIEVE HISTORICAL USER DATA RELATED TO A PLURALITY OF HISTORICAL USERS OF A DATA MANAGEMENT SYSTEM 804.

In one embodiment, at RETRIEVE HISTORICAL USER DATA RELATED TO A PLURALITY OF HISTORICAL USERS OF A DATA MANAGEMENT SYSTEM 804, historical user data is retrieved related to a plurality of historical users of a data management system, using any of the methods, processes, and procedures discussed above with respect to FIGS. 1-6

In one embodiment, once historical user data is retrieved related to a plurality of historical users of a data management system at RETRIEVE HISTORICAL USER DATA RELATED TO A PLURALITY OF HISTORICAL USERS OF A DATA MANAGEMENT SYSTEM 804 process flow proceeds to EXECUTE SOFTWARE INSTRUCTIONS

FOR DATA MANAGEMENT PROCESSES WITH THE HISTORICAL USER DATA 806.

In one embodiment, at EXECUTE SOFTWARE INSTRUCTIONS FOR DATA MANAGEMENT PROCESSES WITH THE HISTORICAL USER DATA 806, software instructions are executed for data management processes with the historical user data, using any of the methods, processes, and procedures discussed above with respect to FIGS. 1-6.

In one embodiment, once software instructions are executed for data management processes with the historical user data at EXECUTE SOFTWARE INSTRUCTIONS FOR DATA MANAGEMENT PROCESSES WITH THE HISTORICAL USER DATA 806, process flow proceeds to GENERATE, FOR EACH HISTORICAL USER, TRACE LOG DATA INDICATING LINES OF THE SOFTWARE INSTRUCTIONS THAT WERE EXECUTED FOR THE HISTORICAL USERS 808.

In one embodiment, at GENERATE, FOR EACH HISTORICAL USER, TRACE LOG DATA INDICATING LINES OF THE SOFTWARE INSTRUCTIONS THAT WERE EXECUTED FOR THE HISTORICAL USERS 808, trace log data is generated, for each historical user, indicating lines of the software instructions that were executed for the historical users, using any of the methods, processes, and procedures discussed above with respect to FIGS. 1-6

In one embodiment, once trace log data is generated, for each historical user, indicating lines of the software instructions that were executed for the historical users at GENERATE, FOR EACH HISTORICAL USER, TRACE LOG DATA INDICATING LINES OF THE SOFTWARE INSTRUCTIONS THAT WERE EXECUTED FOR THE HISTORICAL USERS 808, process flow proceeds to GENERATE, FOR EACH OF A PLURALITY OF RESOLUTION TIERS, CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE SOFTWARE INSTRUCTIONS ASSOCIATED WITH THE RESPECTIVE RESOLUTION TIER THAT WERE EXECUTED FOR THE HISTORICAL USER 810.

In one embodiment, at GENERATE, FOR EACH OF A PLURALITY OF RESOLUTION TIERS, CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE SOFTWARE INSTRUCTIONS ASSOCIATED WITH THE RESPECTIVE RESOLUTION TIER THAT WERE EXECUTED FOR THE HISTORICAL USER 810, code coverage representation value data is generated, for each of a plurality of resolution tiers, including, for each historical user, a respective code coverage representation value based on the sections of the software instructions associated with the respective resolution tier that were executed for the historical user, using any of the methods, processes, and procedures discussed above with respect to FIGS. 1-6

In one embodiment, once code coverage representation value data is generated, for each of a plurality of resolution tiers, including, for each historical user, a respective code coverage representation value based on the sections of the software instructions associated with the respective resolution tier that were executed for the historical user at GENERATE, FOR EACH OF A PLURALITY OF RESOLUTION TIERS, CODE COVERAGE REPRESENTATION VALUE DATA INCLUDING, FOR EACH HISTORICAL USER, A RESPECTIVE CODE COVERAGE REPRESENTATION VALUE BASED ON THE SECTIONS OF THE SOFTWARE INSTRUCTIONS ASSOCIATED WITH THE RESPECTIVE RESOLUTION TIER THAT WERE EXECUTED FOR THE HISTORICAL USER 810, process flow proceeds to END 812.

In one embodiment, at END 812 the process 800 for generating efficient sample sets for testing new data management processes for a data management system is exited to await new data and/or instructions.

As noted, the specific illustrative examples discussed above are but illustrative examples of implementations of embodiments of the method or process for generating efficient sample sets for testing new data management processes for a data management system. Those of skill in the art will readily recognize that other implementations and embodiments are possible. Therefore, the discussion above should not be construed as a limitation on the claims provided below.

In one embodiment, a system generates efficient sample test sets for testing new processes for testing new data management processes for a data management system. The system includes at least one processor at least one memory coupled to the at least one processor. The at least one memory has stored therein instructions which, when executed by any set of the one or more processors, perform a process. The process includes retrieving historical user data related to a plurality of historical users of data management system, executing, for each of the historical users, prior code data corresponding to a previous version of software instructions for data management processes, and generating, for each historical user, trace log data indicating sections of the prior code data that were executed for the historical user based on attributes of the historical user. The process includes generating code coverage representation value data including, for each historical user, a respective code coverage representation value based on the sections of the prior code data that were executed for the historical user, generating grouping data including a plurality of groups of historical users based on the code coverage representation values associated with the historical users, and generating sample test set data by sampling, from each group in the grouping data, one or more historical user.

One embodiment is a method for generating efficient sample sets for testing new data management processes for a data management system. The method includes retrieving historical user data related to a plurality of historical users of data management system, executing, for each of the historical users, prior code data corresponding to a previous version of software instructions for data management processes, and generating, for each historical user, trace log data indicating sections of the prior code data that were executed for the historical user based on attributes of the historical user. The method includes generating code coverage representation value data including, for each historical user, a respective code coverage representation value based on the sections of the prior code data that were executed for the historical user, generating grouping data including a plurality of groups of historical users based on the code coverage representation values associated with the historical users, and generating sample test set data by sampling, from each group in the grouping data, one or more historical user.

In one embodiment, a system for generating efficient sample sets for testing new data management processes for a data management system includes at least one processor and at least one memory coupled to the at least one processor. The at least one memory having stored therein instructions which, when executed by any set of the one or more processors, perform a process. The process includes generating code coverage data indicating, for a plurality of historical users of a data management system, sections of software instructions executed for the historical users and generating code coverage representation value data including, for each historical user, a respective code coverage representation value based on the sections of the software instructions that were executed for the historical user. The process includes generating grouping data including groups of historical users based on the code coverage representation value data and generating sample test set data by sampling, from each group in the grouping data, one or more historical users.

One embodiment is a method for generating efficient sample sets for testing new data management processes for a data management system. The method includes generating code coverage data indicating, for a plurality of historical users of a data management system, sections of software instructions executed for the historical users and generating code coverage representation value data including, for each historical user, a respective code coverage representation value based on the sections of the software instructions that were executed for the historical user. The method includes generating grouping data including groups of historical users based on the code coverage representation value data and generating sample test set data by sampling, from each group in the grouping data, one or more historical users.

In one embodiment, a system for generating efficient sample sets for testing new data management processes for a data management system includes at least one processor and at least one memory coupled to the at least one processor. The at least one memory having stored therein instructions which, when executed by any set of the one or more processors, perform a process. The process includes retrieving historical user data related to historical users of a data management system and executing software instructions for data management processes with the historical user data. The process includes generating, for each historical user, trace log data indicating lines of the software instructions that were executed for the historical users and generating, for each of a plurality of resolution tiers, code coverage representation value data including, for each historical user, a respective code coverage representation value based on the sections of the software instructions associated with the respective resolution tier that were executed for the historical user.

One embodiment is a method for generating efficient sample sets for testing new data management processes for a data management system. The method includes retrieving historical user data related to historical users of a data management system and executing software instructions for data management processes with the historical user data. The method includes generating, for each historical user, trace log data indicating lines of the software instructions that were executed for the historical users and generating, for each of a plurality of resolution tiers, code coverage representation value data including, for each historical user, a respective code coverage representation value based on the sections of the software instructions associated with the respective resolution tier that were executed for the historical user.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the term "historical user data" refers to data that has been stripped of all data, such as Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed data management system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Embodiments of the present disclosure address some of the shortcomings associated with traditional data management systems that generate sample test sets that are highly inefficient and inaccurate. A data management system in accordance with one or more embodiments provides sample test sets that are very small in size and that nevertheless provide for accurate testing because they cover virtually the entire range of historical users. The various embodiments of the disclosure can be implemented to improve the technical fields of data processing, data management, data transmission, data analysis, and data collection. Therefore, the various described embodiments of the disclosure and their associated benefits amount to significantly more than an abstract idea. In particular, by generating efficient sample test sets for testing new processes for preparing electronic documents for users of a data management system, the data management system can learn and incorporate new forms more efficiently.

Using the disclosed embodiments of a method and system for generating efficient sample sets for testing new data management processes for a data management system, a method and system for generating efficient sample sets for testing new data management processes for a data management system more accurately is provided. Therefore, the disclosed embodiments provide a technical solution to the long-standing technical problem of efficiently and accurately testing new calculations or processes in a data management system.

The disclosed embodiments of a method and system for generating efficient sample sets for testing new data management processes for a data management system are also capable of dynamically adapting to constantly changing fields such as tax return preparation and other kinds of document preparation. Consequently, the disclosed embodiments of a method and system for generating efficient sample sets for testing new data management processes for a data management system also provide a technical solution to the long-standing technical problem of static and inflexible data management systems.

The result is a much more accurate, adaptable, and robust method and system for generating efficient sample sets for testing new data management processes for a data management system. This, in turn, results in: less human and processor resources being dedicated to analyzing new forms because more accurate and efficient analysis methods can be implemented, i.e., less time required for analysis by humans, usage of fewer processing resources, usage of fewer memory storage assets, and less communication bandwidth being utilized to transmit data for analysis.

The disclosed method and system for generating efficient sample sets for testing new data management processes for a data management system does not encompass, embody, or preclude other forms of innovation in the area of data management systems. In addition, the disclosed method and system for generating efficient sample sets for testing new data management processes for a data management system is not related to any fundamental economic practice, fundamental data processing practice, mental steps, or pen and paper-based solutions, and is, in fact, directed to providing solutions to new and existing problems associated with data management systems. Consequently, the disclosed method and system for generating efficient sample sets for testing new data management processes for a data management system, does not encompass, and is not merely, an abstract idea or concept.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for generating efficient sample sets for testing new data management processes for a data management system, the method comprising:
    retrieving historical user data related to a plurality of historical users of data management system;
    executing, for each of the historical users, prior code data corresponding to a previous version of software instructions for data management processes;
    generating, for each historical user, trace log data indicating sections of the prior code data that were executed for the historical user based on attributes of the historical user;
    generating code coverage representation value data including, for each historical user, a respective code coverage representation value based on the sections of the prior code data that were executed for the historical user;
    generating grouping data including a plurality of groups of historical users based on the code coverage representation values associated with the historical users; and
    generating sample test set data by sampling, from each group in the grouping data, one or more historical user.

2. The method of claim 1, wherein generating the respective code coverage representation value includes generating the respective code coverage representation value based on lines of the prior code that were executed for the historical user.

3. The method of claim 2, wherein generating the respective code coverage representation value includes generating the respective code coverage representation value based on a selected subset of lines of the prior code.

4. The method of claim 3, wherein the selected subset includes varying lines of the prior code that were executed for the historical users.

5. The method of claim 2, wherein generating the respective code coverage representation value includes generating the respective code coverage representation value based on results of one or more of:
    an if-then statement;
    a do loop;
    a for loop;
    a while loop;
    logical operator;
    functional operator.

6. The method of claim 2, wherein generating the respective code coverage representation value based on lines of the prior code that were executed for the historical user includes generating the respective code coverage representation value based on a number of times that lines of the prior code were executed.

7. The method of claim 1, wherein the sample test set data includes the historical user data associated with the historical users sampled from the grouping data.

8. The method of claim 7, further comprising:
    receiving new calculation data related to a new calculation for generating data values in a data management process; and
    testing the new calculation data by executing the new calculation data for the sample test set data.

9. The method of claim 8, wherein the process further includes:
    generating results data indicating results of testing the new calculation data; and
    outputting the results data.

10. The method of claim 1, wherein the process includes generating the grouping data based on the sections of the prior code data executed for historical users in accordance with the trace log data.

11. The method of claim 10, further comprising generating the grouping data by including a group for each unique code coverage representation value.

12. The method of claim 1, further comprising generating the trace log data with an instrumented run-time engine of a prior code execution and analysis module.

13. The method of claim 1, further comprising:
generating code coverage data based on the trace log data, the code coverage data indicating a portion of the prior code executed for the historical users; and
generating the grouping data based on the code coverage data.

14. The method of claim 1, wherein the data management system is an electronic compliance form preparation system.

15. The method of claim 14, wherein the electronic compliance form generation system is a tax return preparation system, the historical user data includes historical user tax related data related to previously prepared tax returns, and the calculation data includes a calculation for a tax related form associated with a tax return.

16. The method of claim 1, wherein the coverage representation values are hash values.

17. A method for generating efficient sample sets for testing new data management processes for a data management system, the method comprising:
generating code coverage data indicating, for a plurality of historical users of a data management system, sections of software instructions executed for the historical users;
generating code coverage representation value data including, for each historical user, a respective code coverage representation value based on the sections of the software instructions that were executed for the historical user;
generating grouping data including groups of historical users based on the code coverage representation value data;
generating sample test set data by sampling, from each group in the grouping data, one or more historical users.

18. The method of claim 17, wherein the grouping data includes a group for each unique code coverage representation value.

19. The method of claim 17, wherein generating the respective code coverage representation value includes generating the respective code coverage representation value based on lines of the prior code that were executed for the historical user.

20. The method of claim 19, wherein generating the respective code coverage representation value includes generating the respective code coverage representation value based on only variable assignment lines of the prior code that were executed for the historical users.

21. The method of claim 19, wherein generating the respective code coverage representation value includes generating the respective code coverage representation value based on results of one or more of:
an if-then statement;
a do loop;
a for loop;
a while loop;
a logical operator; and
a functional operator.

22. The method of claim 21, wherein the code coverage representation value includes an alphanumeric string.

23. The method of claim 17, wherein the sample test set data includes historical user data associated with the historical users selected in the sampling data.

24. The method of claim 17, further comprising receiving query data requesting the sample test set data for testing the new calculation, wherein requesting the code coverage data includes requesting the code coverage data in response to receiving the query data.

25. The method of claim 24, wherein requesting the code coverage data includes requesting the code coverage data from a third-party data services provider.

26. The method of claim 17, further comprising generating the respective code coverage representation value by concatenating lines of the software instructions that were executed and applying a hash function to the concatenation of lines of the software.

27. A system for generating efficient sample sets for testing new data management processes for a data management system, the system comprising:
at least one processor; and
at least one memory coupled to the at least one processor, the at least one memory having stored therein instructions which, when executed by any set of the one or more processors, perform a process including:
retrieving historical user data related to historical users of a data management system;
executing software instructions for data management processes with the historical user data;
generating, for each historical user, trace log data indicating lines of the software instructions that were executed for the historical users; and
generating, for each of a plurality of resolution tiers, code coverage representation value data including, for each historical user, a respective code coverage representation value based on the sections of the software instructions associated with the respective resolution tier that were executed for the historical user.

28. The system of claim 27, further comprising generating, for each resolution tier, grouping data including a plurality of groups of historical users based on the code coverage representation values.

29. The system of claim 28, further comprising:
receiving query data requesting sample training set data for a selected resolution tier;
generating sample test set data by sampling, from each group in the grouping data associated with the selected resolution tier, one or more historical users.

30. The system of claim 27, further comprising:
generating, for reach resolution tier, respective grouping data including a plurality of groups of historical users based on the code coverage representation values; and
generating, for each resolution tier, respective sample test set data by sampling, from each group in the grouping data associated with the selected resolution tier, one or more historical users.

31. The system of claim 30, further comprising:
receiving query data requesting sample training set data for a selected resolution tier; and
outputting the sample training set data for the selected resolution tier.

* * * * *